(12) United States Patent
Maki et al.

(10) Patent No.: US 8,010,760 B2
(45) Date of Patent: Aug. 30, 2011

(54) STORAGE SYSTEM PERFORMING VIRTUAL VOLUME BACKUP AND METHOD THEREOF

(75) Inventors: Nobuhiro Maki, Yokohama (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 641 days.

(21) Appl. No.: 11/969,306

(22) Filed: Jan. 4, 2008

(65) Prior Publication Data

US 2009/0055613 A1 Feb. 26, 2009

(30) Foreign Application Priority Data

Aug. 22, 2007 (JP) ................................. 2007-215447

(51) Int. Cl.
*G06F 12/00* (2006.01)
*G06F 13/00* (2006.01)
*G06F 13/28* (2006.01)
(52) U.S. Cl. ................. 711/162; 711/165; 711/E12.001
(58) Field of Classification Search .................. 711/165, 711/162
See application file for complete search history.

(56) References Cited

U.S. PATENT DOCUMENTS

| 6,243,824 | B1 * | 6/2001 | Kakuta et al. ..................... 714/3 |
| 2006/0075200 | A1 * | 4/2006 | Satoyama et al. ............ 711/162 |
| 2006/0277386 | A1 | 12/2006 | Eguchi et al. |
| 2007/0079099 | A1 | 4/2007 | Eguchi et al. |
| 2007/0174673 | A1 * | 7/2007 | Kawaguchi et al. .............. 714/6 |
| 2008/0162839 | A1 * | 7/2008 | Nakamichi et al. ........... 711/159 |

FOREIGN PATENT DOCUMENTS

| EP | 1645960 A1 | 4/2006 |
| JP | 2006-338341 | 12/2006 |
| JP | 2007-102455 | 4/2007 |
| WO | 2005017737 A2 | 2/2005 |

* cited by examiner

*Primary Examiner* — Sheng-Jen Tsai
(74) *Attorney, Agent, or Firm* — Brundidge & Stanger, P.C.

(57) ABSTRACT

The respective data fragments stored in each page assigned to the respective virtual areas of the virtual volume are copied to the logical volume, and information representing the respective copy source pages corresponding with information representing the respective virtual areas in the mapping information that indicates which storage area corresponds with which virtual area is updated to information representing the respective copy destination storage areas of the data fragments stored in the respective copy source pages and copies the updated mapping information to the logical volume which constitutes the data fragment copy destination.

12 Claims, 27 Drawing Sheets

FIG. 4

OFFLINE VOLUME MANAGEMENT TABLE (111)

| BACKUP STORAGE ID | BACKUP VOLUME ID | ARCHIVE STORAGE ID | ARCHIVE VOLUME ID | OS MANAGEMENT VOLUME | BACKUP TIME | COMMENT |
|---|---|---|---|---|---|---|
| .. | .. | .. | .. | .. | .. | .. |
| BACKUP STORAGE ID | BACKUP VOLUME ID | ARCHIVE STORAGE ID | ARCHIVE VOLUME ID | OS MANAGEMENT VOLUME | BACKUP TIME | COMMENT |
| 1111 | 1112 | 1113 | 1114 | 1115 | 1116 | 1117 |

FIG. 5

COPY INFORMATION TABLE (113)

| COPY INFORMATION | | | | | | |
|---|---|---|---|---|---|---|
| GROUP ID | PRIMARY STORAGE ID | PRIMARY VOLUME ID | SECONDARY STORAGE ID | SECONDARY VOLUME ID | COPY STATUS |
| .. | .. | .. | .. | .. | .. |
| GROUP ID | PRIMARY STORAGE ID | PRIMARY VOLUME ID | SECONDARY STORAGE ID | SECONDARY VOLUME ID | COPY STATUS |

STORAGE INFORMATION TABLE — 114

| STORAGE ID (1141) | | |
|---|---|---|
| VOLUME ID (1142) | VIRTUAL FLAG (1143) | |
| VOLUME ID (1142) | VIRTUAL FLAG (1143) | |
| .. | .. | |
| VOLUME ID (1142) | VIRTUAL FLAG (1143) | |

FIG. 7

COPY PAIR MANAGEMENT INFORMATION — 1210

| LOGICAL VOLUME ID | COPY STATUS INFORMATION | COPY TARGET STORAGE ID | COPY TARGET VOLUME ID | COPY PAIR ID | GROUP ID | COPY TYPE |
|---|---|---|---|---|---|---|
| 12101 | 12102 | 12103 | 12104 | 12105 | 12106 | 12107 |

FIG. 8

VOLUME MANAGEMENT INFORMATION 1250

| LOGICAL VOLUME ID | VOLUME STATUS | CAPACITY | COPY PAIR ID | GROUP ID | VIRTUAL FLAG |
|---|---|---|---|---|---|
| 12501 | 12502 | 12503 | 12504 | 12505 | 12506 |

FIG. 9

VIRTUAL VOLUME MANAGEMENT INFORMATION 1270

| VOLUME ID | 12701 |
| PREVIOUS REFERENCE ADDRESS | 12702 |
| POOL ID | 12703 |

ADDRESS MAP:

| VIRTUAL ADDRESS | LOGICAL ADDRESS POINTER | UPDATE FLAG |
|---|---|---|
| .. | .. | .. |
| 12704 | 12705 | 12706 |

FIG. 19

CONSTITUTION TABLE

| NUMBER OF VIRTUAL VOLUMES | | | | | |
|---|---|---|---|---|---|
| T POINTER | | | | | |
| VOLUME ID | OS ADDRESS | CAPACITY | USER INFORMATION | BACKUP POINTER | |
| VOLUME ID | .. | .. | .. | .. | |
| VOLUME ID | OS ADDRESS | CAPACITY | USER INFORMATION | BACKUP POINTER | |

DATA UPDATE AVOIDANCE BUFFER

| VOLUME ID | VIRTUAL ADDRESS | DATA FRAGMENT |
|---|---|---|
| .. | .. | .. |
| VOLUME ID | VIRTUAL ADDRESS | DATA FRAGMENT |

1110, 11101, 11102, 11103

US 8,010,760 B2

STORAGE SYSTEM PERFORMING VIRTUAL VOLUME BACKUP AND METHOD THEREOF

CROSS-REFERENCE TO PRIOR APPLICATION

This application relates to and claims the benefit of priority from Japanese Patent Application number 2007-215447, filed on Aug. 22, 2007 the entire disclosure of which is incorporated herein by reference.

BACKGROUND

The present invention generally relates to logical device backups.

Types of logical volume include, for example, a real volume that is formed based on the storage space of one or more storage devices (logical volumes of a real entity), and virtual volumes based on Thin Provisioning technology (virtual logical volumes). A storage area that constitutes a real volume ('real area' hereinbelow) is assigned to a virtual storage area ('virtual area' hereinbelow) in a virtual volume and data is written to the real area (Japanese Application Laid Open No. 2006-338341, for example). Data fragments which are stored in the real area assigned to the virtual volume can be copied to the real volume (Japanese Application Laid Open No. 2007-102455, for example).

Cases where a virtual volume that is undergoing a backup is utilized can arise. Hence, it is necessary to be able to restore a virtual volume undergoing a backup.

SUMMARY

Therefore, an object of the present invention is to be able to restore a virtual volume undergoing a backup.

Further objects of the present invention will become evident from the subsequent description.

Respective data fragments stored in respective pages assigned to respective virtual areas of a virtual volume are copied to a logical volume and information representing respective copy source pages that corresponds to information representing the respective virtual areas in mapping information that indicates which storage area corresponds to which virtual area is updated to information that represents respective copy destination storage areas for the data fragments stored in the respective copy source pages and the updated mapping information is copied to a logical volume which constitutes the copy destination for the data fragments.

BRIEF DESCRIPTION OF THE DRAWINGS

FIG. 4 is a constitutional view of an offline volume management table that is stored in a management computer;

FIG. 5 is a constitutional view of a copy information table that is stored in a management computer;

FIG. 6 is a constitutional view of a storage information table that is stored in the management computer;

FIG. 7 is a constitutional view of copy pair management information that is stored in the storage system;

FIG. 8 is a constitutional view of volume management information that is stored in the storage system;

FIG. 9 is a constitutional view of virtual volume management information that is stored in the storage system;

FIG. 19 is a constitutional view of a constitution table that is stored in the storage system;

FIG. 20 is a constitutional view of a data update avoidance buffer that is stored in the storage system;

DESCRIPTION OF THE PREFERRED EMBODIMENTS

Figure 1:
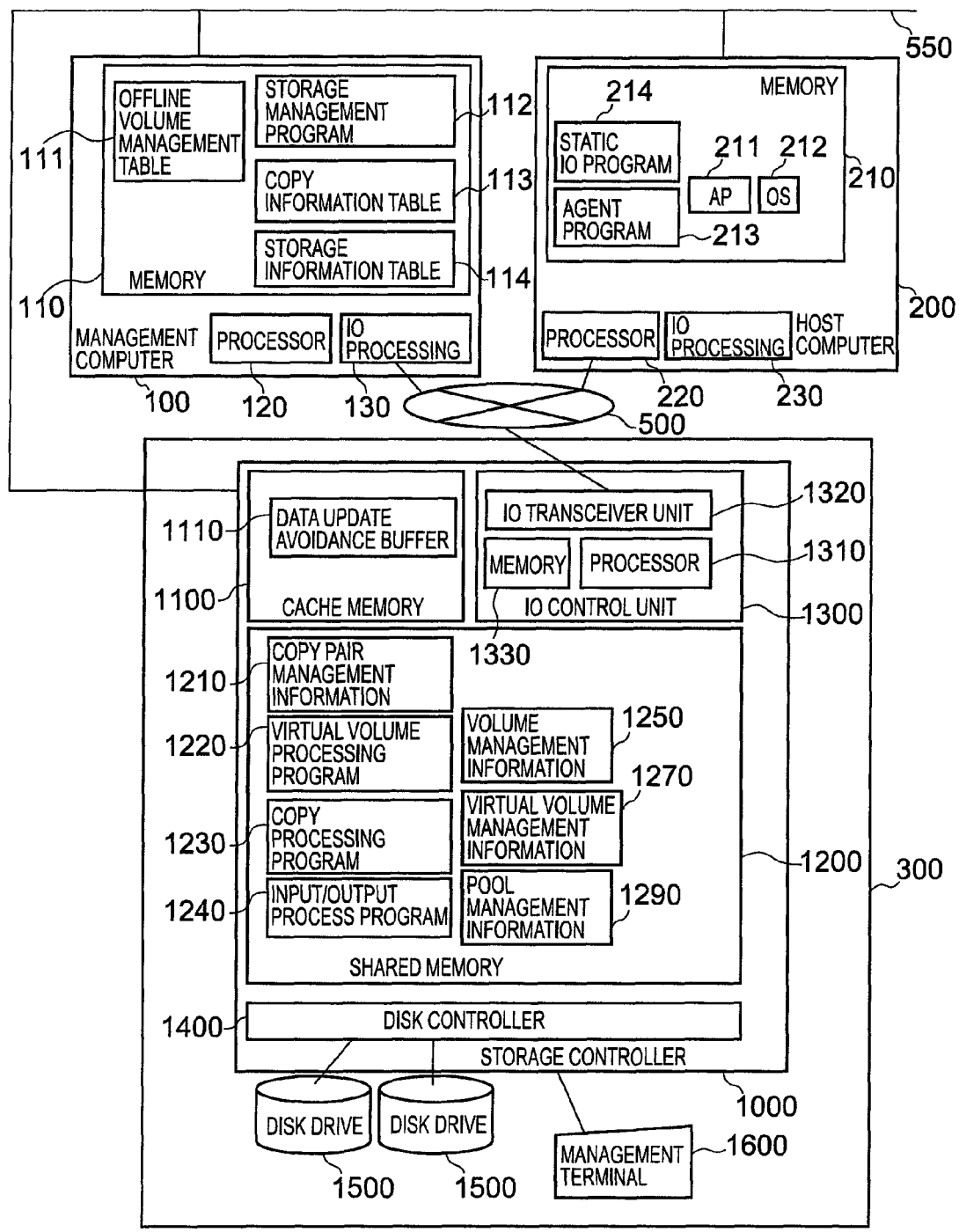
FIG. 1 is a block diagram showing the constitution of a computer system according to a first embodiment of the present invention.

In an embodiment 1, a storage system comprises a virtual volume that is constituted by a plurality of virtual areas; a logical volume; a pool that has a plurality of pages which are storage areas that can be assigned to the virtual areas of the virtual volume; mapping information that indicates which storage areas correspond with which virtual areas; an I/O processing unit; and a backup processing unit. The I/O processing unit receives a write request from a computer, assigns a page in the pool to a virtual area of a virtual volume that is designated by the write request, writes data fragments corresponding to the write request to the assigned page, and associates information representing the page with information representing the virtual area to which the page is assigned, in the mapping information. The backup processing unit copies a plurality of data fragments that are stored in each of a plurality of pages that are assigned to the virtual volume to the logical volume without copying virtual areas to which pages have not been assigned in the virtual volume to the logical volume, updates information representing the respective copy source pages in the mapping information to information that represents respective copy destination storage areas for the data fragments stored in the respective copy source pages, and copies the updated mapping information to the logical volume constituting the data fragment copy destination. The mapping information is stored in storage resources (memory, for example) in the storage system, for example. In addition, the logical volume constituting the copy destination of the data fragments and the updated mapping information may also be a logical volume that is provided in a removable storage device. In specific terms, for example, the logical volume can be a virtual volume of a type with which it is unmistakably settled which real area is accessed when a particular virtual area of the virtual volume is the access destination and, more specifically, for example, a virtual volume that adheres to storage virtualization technology which corresponds with an external logical volume that is formed based on the storage device that is provided in an external storage system, for example.

In an embodiment 2, the backup processing unit according to the embodiment 1, serially arranges the plurality of data fragments in the logical volume.

In an embodiment 3, the backup processing unit according to at least one of the embodiments 1 and 2, starts to write the updated mapping information starting from the next storage area following the plurality of consecutive storage areas in which the plurality of data fragments are arranged.

In an embodiment 4, the backup processing unit according to at least one of the embodiments 1 to 3, copies a plurality of data fragments which are stored in each of a plurality of pages assigned to the virtual volumes and the updated mapping information for a certain virtual volume among the plurality of virtual volumes. And the backup processing unit subsequently writes the plurality of data fragments which are stored in each of the plurality of pages assigned to the virtual volumes and the updated mapping information for another virtual volume among the plurality of virtual volumes.

In an embodiment 5, the backup processing unit according to the embodiment 4, creates constitutional information indicating where in the logical volume the mapping information for a particular virtual volume is stored and copies the constitutional information to the logical volume.

In an embodiment 6, the storage system according to the embodiment 5, further comprises a restore processing unit. The restore processing unit reads the constitution information from the logical volume, specifies, from the constitution information, the location in which the mapping information corresponding with a virtual volume that is selected from two or more virtual volumes is stored, reads the mapping information corresponding with the selected virtual volume from the specified location of the logical volume, and provides the computer with a virtual volume based on the mapping information thus read.

In an embodiment 7, the storage system according to at least one of the embodiments 1 to 6, further comprises a restore processing unit. The restore processing unit reads the mapping information from the logical volume and provides the computer with a restore virtual volume which is a virtual volume based on the mapping information thus read without executing restore copy processing. The restore copy processing is processing that reads a plurality of data fragments specified by the mapping information thus read from the logical volume and copies the plurality of data fragments to a plurality of pages which are assigned to a plurality of virtual areas specified by the mapping information.

In an embodiment 8, the I/O processing unit according to the embodiment 7 accepts a read request designating the restore virtual volume from the computer but does not accept a write request designating the restore virtual volume from the computer.

The ninth embodiment is the seventh embodiment, wherein, in cases where a write request designating the restore virtual volume is accepted from the computer, the I/O processing unit updates information representing storage areas of the logical volume, which corresponds to information that represents the virtual areas designated by the write request in the mapping information, to information representing the pages assigned to the virtual areas.

In an embodiment 10, the storage system according to at least one of the embodiments 1 to 9, further comprises a restore processing unit. The restore processing unit reads mapping information from the logical volume and provides the computer with a restore virtual volume which is a virtual volume based on the mapping information thus read after executing restore copy processing.

According to at least one of the embodiments 1 to 10, the virtual volumes and logical volumes may also exist in separate storage systems. Further, two or more embodiments among the embodiments 1 to 10 can be combined. In addition, each of the aforementioned parts (the I/O processing unit, backup processing unit, and restore processing unit, for example) can be constructed by hardware, computer programs or a combination thereof (some of the parts can be implemented by a computer program and the remainder can be implemented by hardware, for example). Computer programs are read to a predetermined processor and executed thereby. In addition, in the event of information processing that is performed by reading a computer program to a processor, storage areas that exist in hardware resources such as memory may also suitably be used. Furthermore, a computer program may be installed on a computer from a recording medium such as a CD-ROM or downloaded to a computer via a communication network.

A few embodiments will be described hereinbelow with reference to the drawings.

First Embodiment

FIG. 1 is a block diagram showing the constitution of a computer system according to a first embodiment of the present invention.

The computer system comprises a management computer 100, a host computer 200, a storage system 300, and a management terminal 1600.

One of each of the management computer 100 and host computer 200 is shown but any number thereof may also be provided. In addition, one storage system 300 is illustrated but any number thereof may also be provided.

The management computer 100, host computer 200, and storage system 300 are mutually connected via a first communication network (a SAN (Storage Area Network), for example) 500. Further, the management computer 100 is connected via a second communication network (a LAN (Local Area Network), for example) to the host computer 200 and storage system 300. In the example of FIG. 1, the management terminal 1600 is directly connected to the storage system 300 but may also be connected to the storage system 300 via at least one of the first and second communication networks 500 and 550.

The management computer 100 is a computer that comprises a memory 110, processor 120, and I/O processing unit 130. The memory 110, processor 120, and I/O processing unit 130 are mutually connected by an internal network (not shown).

The processor 120 performs various processing by executing a program that is stored in the memory 110. For example, the processor 120 controls a remote copy that is executed by the storage system 300 by transmitting an IO request to the storage system 300. Further, IO requests include write requests, read requests, or remote copy control requests and so forth. IO requests will be described in detail subsequently with reference to FIG. 11.

Memory 110 stores information that is required by programs executed by processor 120 and by processor 120, or the like. More specifically, the memory 110 stores an offline volume management table 111, a storage management program 112, a copy information table 113, and a storage information table 114. Furthermore, memory 110 may also store an OS (Operating System) and application programs (AP). In cases where computer programs are the subject hereinbelow, processing is actually carried out by the processor (CPU, for example) that executes the computer program.

The storage management program 112 manages the storage system 300.

The offline volume management table 111 is information for managing the subsequently described offline volume. The offline volume management table 111 will also be described in detail subsequently with reference to FIG. 4.

The copy information table 113 is information for managing the constitution and status of a local copy and remote copy. Hence, the memory 110 stores the same number of copy information tables 113 as the number of local copies which are managed by the management computer 100. The copy information table 113 will be described in detail subsequently with reference to FIG. 5. Local copies and remote copies will also be described subsequently.

The storage information table 114 is information relating to the storage system 300 that is managed by the management computer 100. The storage information table 114 will be described in detail in FIG. 6.

The IO processing unit 130 is an interface that is connected to the host computer 200 and storage system 300 via a data communication line 510.

The host computer 200 is a computer that comprises a memory 210, a processor 220, and an I/O processing unit 230. The memory 210, processor 220, and I/O processing unit 230 are mutually connected by an internal network (not shown).

The processor 220 performs various processing by executing a program that is stored in the memory 210. For example, the processor 220 accesses the data of the logical volume in the storage system 300 by transmitting an IO request to the storage system 300.

The memory 210 stores information and so forth that is required by programs that are executed by the processor 220 and by the processor 220. More specifically, the memory 210 stores an application program (AP) 211, an OS 212, an agent program 213, and a static IO program 214.

The AP 211 executes various processing. For example, AP 211 provides a database function or WEB server function. The OS 212 controls all of the processing of the host computer 200. The agent program 213 accepts instructions from the management computer 100. The Static IO program works with the OS and controls IO requests.

The IO processing unit 230 is an interface for communicating with the management computer 100 and storage system 300. In specific terms, the I/O processing unit 230 transmits IO requests to the storage system 300.

The storage system 300 comprises a storage controller 1000 and a plurality of disk drives (or one disk drive) 1500.

The disk drives 1500 are disk-type storage media drives which store data for which writing is requested by the host computer 200. Instead of the disk drive 1500, a storage device of another type (a flash memory drive, for example) maybe adopted. Moreover, at least one of the plurality of disk drives 1500 may also be a removable storage device. Further, a real volume which constitutes the backup destination of the virtual volume may also be provided in a removable storage device.

The storage controller 1000 controls the operation of the storage system 300. More specifically, for example, the storage controller 1000 controls the writing of data to the disk drives 1500 and the reading of data from the disk drives 1500. In addition, the storage controller 1000 provides the host computer 200 with one or more logical volumes. The one or more logical volumes include at least one of one or more real volumes which are one or more logical storage areas that are formed based on the storage space of the one of more disk drives 1500 and a virtual volume.

The storage controller 1000 comprises a cache memory 1100, a shared memory 1200, an IO controller 1300, and a disk controller 1400. The cache memory 1100, shared memory 1200, IO controller 1300, and disk controller 1400 are mutually connected by an internal network (not shown).

The cache memory 1100 temporarily stores data that are written to the disk drives 1500 and data that are read from the disk drives 1500.

The disk controller 1400 controls the writing of data to the disk drives 1500 and the reading of data from the disk drives 1500. Further, the disk controller 1400 generates a real volume based on a storage space of one or more disk drives 1500.

The IO controller 1300 comprises a processor 1310, an IO transceiver 1320, and a memory 1330. The processor 1310, IO transceiver 1320, and memory 1330 are mutually connected by means of an internal network (not illustrated).

The IO transceiver 1320 is an interface that communicates via the first communication network 500 (at least one of the management computer 100, host computer 200, and another storage system 300 communicates, for example). More specifically, for example, the IO transceiver 1320 receives IO requests from the management computer 100 or host computer 200. In addition, the IO transceiver 1320 transmits data that are read from the disk drives 1500 to the management computer 100 or host computer 200.

The processor 1310 performs various processing by executing a program that is stored in the memory 1330 or shared memory 1200. More specifically, for example, the processor 1310 processes IO requests that are received by the IO transceiver 1320.

The memory 1330 stores information and so forth that is required by the programs executed by the processor 1310 and by the processor 1310.

The shared memory 1200 stores information and so forth that is required by the programs executed by the processor 1310 and by the processor 1310. In addition, the shared memory 1200 stores information and so forth that is required by programs executed by the disk controller 1400 and by the disk controller 1400. More specifically, for example, the shared memory 1200 stores copy pair management information 1210, a virtual volume processing program 1220, a copy processing program 1230, an input/output process program 1240, volume management information 1250, virtual volume management information 1270, and pool management information 1290.

The copy pair management information 1210 is information for managing a copy pair that comprises logical volumes that are provided by the storage system 300. The copy pair is a copy constitution that comprises two logical volumes which are a local-copy target and a remote-copy target respectively. In addition, the copy pair management information 1210 will be described in detail subsequently with reference to FIG. 7.

The virtual volume processing program 1220 implements virtual volume-related processing. The copy processing program 1230 performs a local copy. The input/output process program 1240 processes IO requests that are received by the IO transceiver 1320.

The volume management information 1250 is information for managing logical volumes and virtual volumes that are provided by the storage system 300. The volume management information 1250 will be described in detail with reference to FIG. 8.

The virtual volume management information 1270 is correspondence information for virtual storage areas of the virtual volumes and assigned areas of the logical volumes. The virtual volume management information 1270 will be described in detail with reference to FIG. 9.

The pool management information 1290 is information for managing logical volumes that can be assigned to the virtual volumes. The pool management information 1290 will be described in detail with reference to FIG. 10.

The input/output process program is a program for processing IO requests.

The management terminal 1600 is connected to the storage controller 1000 provided in the storage system 300. The management terminal 1600 is a computer that comprises a processor, memory, and interface. The management terminal 1600 transmits information that is input by the system administrator (user) to the storage controller 1000 of the storage system 300.

An overview of the processing that is performed in the first embodiment of the present invention will be described next.

Figure 2:
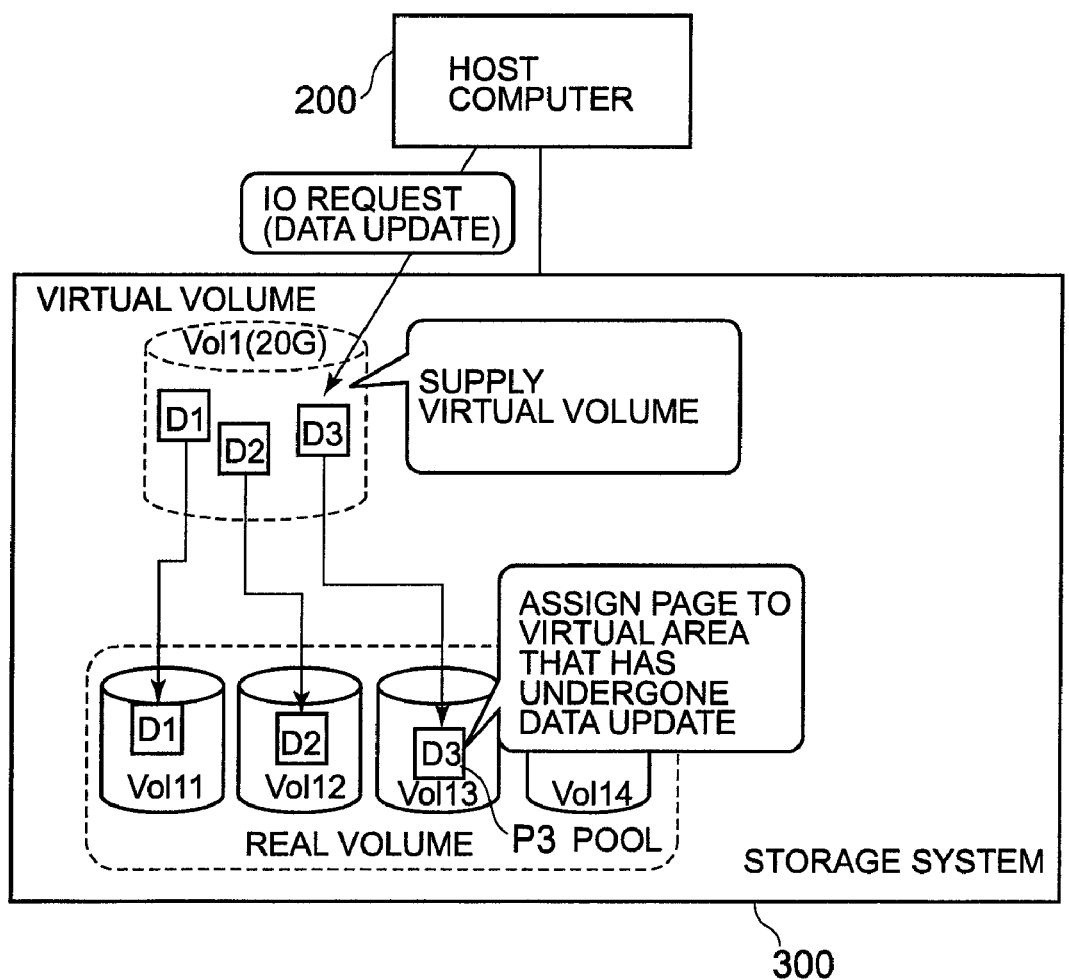
FIG. 2 is an explanatory diagram of virtual volume processing.

FIG. 2 is an explanatory diagram of the virtual volume processing of the storage system 300.

The storage system 300 provides the host computer 200 with a virtual volume. The host computer 200, which is the destination for the provision of the virtual volume, identifies the fact that a logical volume of a specified capacity exists in the storage system (that is, the logical volume is identified in the same way as a real volume). The storage system 300 assigns a real area (a real area of a real volume that constitutes the subsequently described pool) to a virtual area in cases where a data IO request designating a virtual volume and a virtual area thereof (a write request or read request) is received from the host computer 200.

In FIG. 2, for example, the storage system 300 provides the host computer 200 with a 20 GB (Gigabyte) virtual volume (Vol1). Here, for example, a data fragment D3 is stored in a virtual area of the virtual volume (Vol1) as a result of the data IO request from the host computer 200 but, in reality, data fragment D3 is stored in a real area (P3) that is assigned to the virtual area. A real area constituting a unit of assignment with respect to the virtual volume will be called a 'page' hereinafter and data that are stored in the page (in other words, data that are stored in the page assignment destination virtual area) will be called a 'data fragment'. Page P3 is provided by a real volume (Vol3). Further, in order to make a distinction from a normal real volume that is accessed by the host computer 200, the storage system 300 manages real volumes used for page provision as logical volumes that belong to a special volume group (called a 'pool' hereinafter).

An overview of the virtual volume backup processing will be described next by using FIG. 3.

Figure 3:
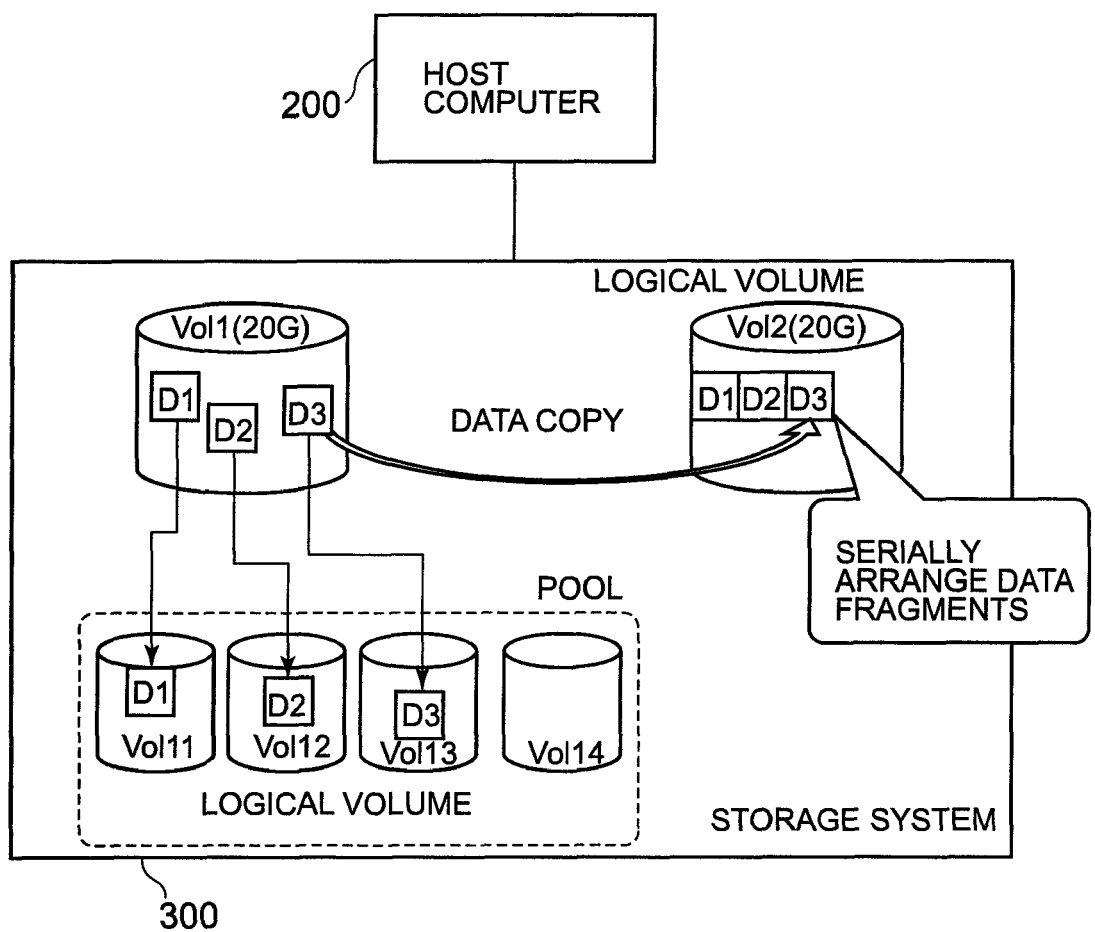
FIG. 3 is an explanatory diagram that provides an overview of virtual volume backup processing.

FIG. 3 is an explanatory diagram that provides an overview of virtual volume backup processing.

In order to back up a virtual volume in the logical volume, the storage system 300 copies data fragments stored in a page that is assigned to the virtual volume to the logical volume (real volume, for example). Here, the storage system 300 serially arranges the data fragments in the logical volume.

In FIG. 3, data fragments D1 and D2 are copied and the storage system 300 copies data fragment D3 to a logical volume (Vol2). However, data fragment D3 is written to the next real area that succeeds the real area in which the data fragment D2 is stored so that a free area is not generated between data fragment D3 and data fragment D2.

Thus, in cases where the respective data fragments stored in the virtual volume (Vol1) are backed up to the logical volume (Vol2), the storage system 300 copies a plurality of data fragments that are virtually interspersed within the virtual volume (Vol1) to a plurality of consecutive real areas of the logical volume (Vol2) (in other words, sequentially writes the plurality of data fragments to the logical volume (Vol2)). Accordingly, the generation of futile free areas in the logical volume (Vol2) can be prevented.

The storage system 300 is also able to sequentially copy a plurality of data fragments that exist in a plurality of virtual volumes to one logical volume (Vol2). In addition, as shown in FIG. 3, the storage capacity of the logical volume (Vol2) may be the same as the virtual volume (Vol1) or may be larger or smaller than the virtual volume (Vol1).

FIG. 4 is a constitutional view of the offline volume management table 111 that is stored in the management computer 100.

Each record (row) constituting the off line volume management table 111 records a backup storage ID 1111, a backup volume ID 1112, an archive storage ID 1113, an archive volume ID 1114, OS management volume information 1115, a backup time 1116, and a comment 1117, for example.

The backup storage ID 1111 is the unique identifier of the storage system 300 that provides a backup target virtual volume.

The backup volume ID 1112 is the unique identifier of the backup target virtual volume.

The archive storage ID 1113 is the unique identifier of the storage system 300 that provides a backup destination logical volume.

The archive volume ID 1114 is the unique identifier of the backup destination logical volume.

The OS management volume information 1115 is OS volume management information that the host computer 200 provides for the backup target virtual volume. For example, the drive name and volume serial number and so forth apply here as OS volume management information.

The backup time 1116 is the time at which the management computer 100 orders the start of backup processing.

The comment 1117 is additional information that is required to comprehend the content of the data stored in the virtual volume of the backup target.

FIG. 5 is a constitutional view of the copy information table 113 that is stored in the management computer 100.

The copy information table 113 comprises copy information 1131, a group ID 1132 and copy constitution information.

The copy information 1131 comprises the copy type and the copy option information. The copy type indicates that the copy managed by the copy information table 113 is a local copy or a remote copy. A local copy is a copy that is carried out within the same storage system 300. In this case, a copy source logical volume and copy destination logical volume exist in the same storage system 300. A remote copy is a copy that is carried out between different storage systems 300. In this case, the copy source logical volume and copy destination logical volume exist in different storage systems 300. The copy option information is information representing options that are provided for each copy type. For example, option information indicates whether it is possible to write to a secondary volume (copy destination logical volume) during suspension of a local copy. Suspension of a local copy is suspension of a local copy which results from an instruction from the management computer 100.

The group ID 1132 is the unique identifier of a group that comprises a plurality of copy pairs. By using a group, the management computer 100 is able to collectively control the copy pairs that are included in the group.

The copy constitution information includes a primary storage system ID 1133, a primary volume ID 1134, a secondary storage system ID 1135, a secondary volume ID 1136, and copy status information 1137.

The primary storage system ID 1133 is the unique identifier of the storage system (primary storage system) 300 that provides a copy source logical volume (primary volume). A primary volume ID 1134 is the unique identifier of a logical volume (primary volume) constituting the copy source.

The secondary storage system ID 1135 is the unique identifier of the storage system (secondary storage system) 300 that provides a logical volume constituting the copy destination. In the case of a local copy, the ID is the same ID as that of the primary storage system. The secondary volume 1136 is the unique identifier of a logical volume (secondary volume) that constitutes the copy destination.

The copy status information 1137 indicates the current status of the copies that are managed by the copy information table 113. More specifically, for example, the copy status information 1132 indicates that the status of the copies managed by the copy information table 113 are any of 'copy in progress', 'suspended', 'paired status', or 'abnormal status'.

FIG. 6 is a constitutional view of the storage information table 114 that is stored in the management computer 100.

The storage information table 114 comprises a storage system ID 1141 and a logical volume ID 1142.

The storage system ID 1141 is the unique identifier of the storage system 300 that is managed by the management computer 100. The logical volume ID 1142 is the unique identifier of a logical volume that is provided by the storage system 300 which is identified by the storage system ID 1141. A virtual flag 1143 indicates whether the volume is a logical volume or a virtual volume. For example, in cases where the virtual flag is "1", this indicates that the logical volume identified by the volume ID corresponding to the virtual flag is a virtual volume.

FIG. 7 is a constitutional view of the copy pair management information 1210 that is stored in the storage system 300.

The copy pair management information 1210 comprises a logical volume ID 12101, copy status information 12102, a copy target storage system ID 12103, a copy target volume ID 12104, a copy pair ID 12105, a copy group ID 12106, and a copy type 12107.

The logical volume ID 12101 is the unique identifier of the logical volume that is provided by the storage system 300 which stores the copy pair management information 1210.

The copy status information 12102 indicates the current status of the copy with respect to the logical volume identified by the logical volume ID 12101. In specific terms, for example, the copy status information 12102 indicates whether the logical volume identified by the logical volume ID 12101 is a primary volume, secondary volume, or is in a copy in progress, suspended or abnormal state.

The copy target volume ID 12104 is the unique identifier of the logical volume that forms a copy pair with the logical volume that is identified by the logical volume ID 12101. That is, the copy target volume ID 12104 is the unique identifier of the logical volume constituting the copy destination or copy source of the data that are stored in the logical volume identified by the logical volume ID 12101.

The copy target storage ID 12103 is the unique identifier of the storage system 300 that provides the logical volume that forms a copy pair with the logical volume identified by the logical volume ID 12101. That is, the copy target storage ID 12103 is the unique identifier of the storage system 300 that provides the logical volume that is identified by the copy target volume ID 12104.

The copy pair ID 12105 is the unique identifier of a copy pair comprising the logical volume identified by the logical volume ID 12101 and the logical volume which is identified by the copy target volume ID 12104.

The copy group ID 12106 is the unique identifier of the copy group to which the copy pair identified by the copy pair ID 12105 belongs. The storage system 300 manages a copy group comprising one or more copy pairs. For this reason, the management computer 100 is able to designate a copy group and issue an instruction collectively to copy pairs contained in the group to suspend, restart, or cancel a local copy or remote copy operation.

The copy type 12107 is the type of copy that is executed by the copy pair identified by the copy pair ID 12105. More specifically, for example, the copy type 12107 represents a local copy or a remote copy.

FIG. 8 is a constitutional view of volume management information 1250 that is stored in the storage system 300.

The volume management information 1250 includes a logical volume ID 12501, volume status information 12502, the capacity 12503, a copy pair ID 12504, a group ID 12505, and a virtual flag 12506.

The logical volume ID 12501 is the unique identifier of the logical volume that is provided by the storage system 300 that stores the volume management information 1250.

The volume status information 12502 indicates the current status of the logical volume that is identified by the logical volume ID 12501. More specifically, for example, the volume status information 12502 represents at least one of a primary volume, secondary volume, or a normal, abnormal, or unmounted status. More specifically, for example, in cases where the logical volume identified by the logical volume ID 12501 is a primary volume, the volume status information 12502 indicates a 'primary volume'. In addition, in cases where the logical volume identified by the logical volume ID 12501 is a secondary volume, the volume status information 12502 indicates a 'secondary volume'. Further, in cases where the host computer 200 is able to normally access the logical volume identified by the logical volume 12501, the volume status information 12502 indicates 'normal'. In addition, in cases where the host computer 200 is unable to normally access the logical volume identified by the logical volume ID 12501, the volume status information 12502 indicates 'abnormal'. For example, upon failure of disk drive 1500 and in the event of a copy fault, the volume status information 12502 indicates 'abnormal'. Further, in cases where the data are stored in the logical volume identified by the logical volume ID 12501, the volume status information 12502 indicates 'unmounted'.

The capacity 12503 is the capacity of the logical volume identified by the logical volume ID 12501.

The copy pair ID 12504 is the unique identifier of a copy pair that comprises the logical volume which is identified by the logical volume ID 12501.

The group ID 12505 is the unique identifier of a copy group to which the copy pair identified by the copy pair ID 12504 belongs.

The virtual flag 12506 indicates whether the logical volume identified by the logical volume ID 12501 is a virtual volume.

FIG. 9 is a constitutional example of the virtual volume management information 1270 that is stored in the storage system 300.

The virtual volume management information 1270 is information relating to a virtual volume. The number of virtual volume management information items 1270 is the same number as the number of virtual volumes held by the storage system 300. That is, the virtual volume management information items 1270 and virtual volumes correspond on a one-to-one basis. The virtual volume management information 1270 includes a volume ID 12701, a previous reference address 12702, a pool ID 12703, and an address map. The storage system 300 which stores the virtual volume information 1270 is called the 'storage system 300' and the virtual volume that corresponds with the virtual volume management information 1270 is called the 'virtual volume' hereinbelow.

The volume ID 12701 is the unique identifier of the virtual volume.

The previous reference address 12702 is the address of the virtual area constituting the virtual volume and is the address of the virtual area accessed on the previous occasion. In cases where the storage system 300 receives an IO request to update or reference data which designates a virtual volume from the host computer 200, the previous reference address 12702 is updated to the access destination address (virtual area address) that is designated by the IO request.

The pool ID 12703 is an identifier that uniquely indicates a pool that is managed by the storage system 300. The pool ID 12703 is used in order to specify a real volume group that provides the virtual volume with pages.

The address map is constituted by a virtual address 12704, a logical volume ID 12705, a logical address pointer 12705, and an update flag 12706.

The virtual address 12704 is an extent address which indicates a virtual area of the virtual volume. The size of the virtual area is the same as the size of the page. In cases where a virtual volume is designated by an IO request from the host computer 200, a virtual address that represents the access destination virtual area of the virtual volume is also designated.

The logical address pointer 12705 comprises the logical volume ID of a real volume that belongs to the pool ID 12703 and the address of a page in the real volume. That is, in cases where a page has been assigned to the virtual area, the logical address pointer 12705 is information including the address of the page and the logical volume ID of the real volume that comprises the page. In cases where a page has not been assigned to the virtual area, information indicating 'free' is provided as the logical address pointer 12705 that corresponds with the virtual address 12704 of the virtual area.

The update flag 12706 is a flag that is used during copy processing of the virtual volume. The rules for using an update flag will be described subsequently.

Figure 10:
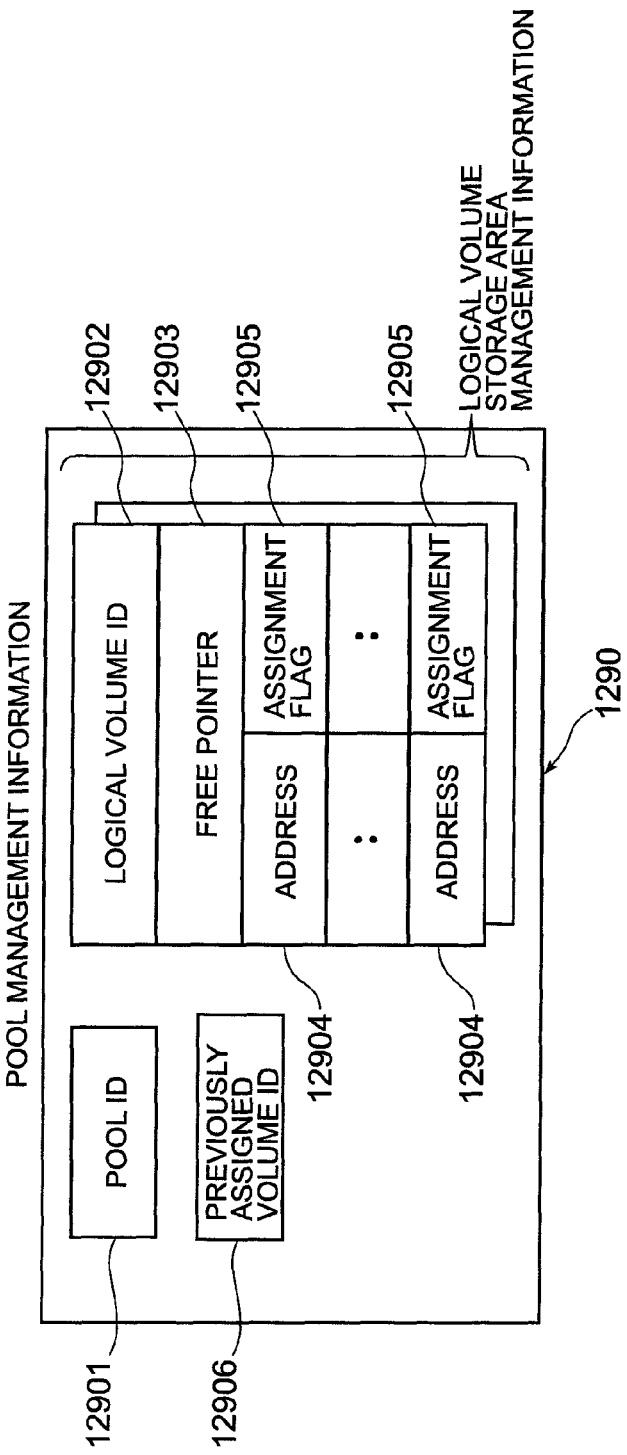
FIG. 10 is a constitutional view of pool management information that is stored in the storage system.

FIG. 10 is a constitutional view of the pool management information 1290 that is stored in the storage system 300.

The pool management information 1290 is information for managing the pool. The number of pool management information items 1290 is the same as the number of pools. That is, the pool management information items 1290 and pools correspond on a one-to-one basis. The pool management information 1290 includes a pool ID 12901, a previously assigned volume ID 12906 and a logical volume storage area management information. The pool corresponding with the pool management information 1290 is called the 'pool'.

The pool ID 12901 is a unique identifier that uniquely indicates the pool.

The previously assigned volume ID 12906 is an identifier that uniquely indicates a real volume that belongs to the pool. The previously assigned volume ID 12906 is a real volume that belongs to the pool and stores the ID of the real volume that comprises the page that was ultimately assigned.

The logical volume storage area management information is information for managing the real volumes belonging to the pool. The number of logical volume storage area management information items is the same as the number of real volumes that belong to the pool. That is, the logical volume storage area management information items and the real volumes which belong to the pool correspond on a one-to-one basis. The logical volume storage area management information includes a logical volume ID 12902, a free pointer 12903, an address 12904, and an assignment flag 12905. The real volume that corresponds with the logical volume storage area management information is called the 'real volume'.

The logical volume ID 12902 is the unique identifier of the real volume.

The free pointer 12903 is a pointer that indicates the address 12904 of a certain assignable page of the real volume (a page that has not been assigned to the virtual volume, for example) (for example, in cases where there are a plurality of assignable pages, this is a pointer that indicates the previous assignable page among the plurality of assignable pages).

The address 12904 represents the address of the page.

The assignment flag 12905 indicates whether the corresponding page has been assigned or not assigned (that is, if the page is assignable or unassignable).

Figure 11:
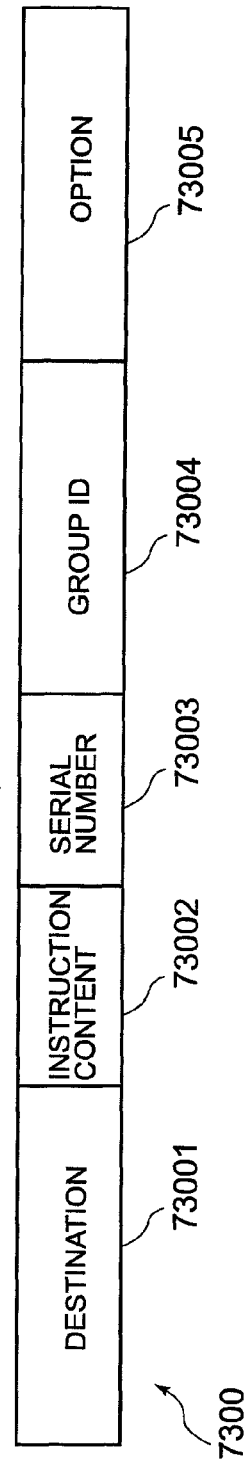
FIG. 11 is an explanatory diagram of an IO request 7300.

FIG. 11 is an explanatory diagram of IO request 7300.

The IO request 7300 is issued by the management computer 100 or host computer 200. The IO request 7300 comprises a destination 73001, instruction content 73002, a serial number 73003, a group ID 73004, and an option 73005.

The destination 73001 is information relating to the address of the IO request 7300. The destination 73001 is, for example, information that includes the identifier of the storage system 300 constituting the transmission destination of the IO request 7300, the identifier of the logical volume of the storage system 300 (the virtual volume or real volume, for example), and the address (volume address) of the storage area of the logical volume (the virtual area or real area, for example).

The instruction content 73002 is the content of the processing instructed by the IO request 7300. For example, the instruction content 73002 is a local copy or remote copy control instruction, or a data access instruction. As the local copy or remote copy control instruction, for example, the instruction content 73002 is a local copy new start, a local copy addition, a local copy close, a remote copy new start, a remote copy addition, a remote copy close, restore preparations, a high-speed restore, a normal restore (the restore preparations, high-speed restore, and normal restore are common to a local copy and remote copy) or status acquisition. A data access instruction is a data write or data reference instruction, for example.

The serial number 73003 indicates the order in which the IO request 7300 is issued. Hence, the serial number 73003 is determined by the management computer 100 or host computer 200 which are the sources of the IO request 7300.

The group 73004 is a unique identifier of a copy group that constitutes a target of the processing of the IO request 7300.

The option 73005 is copy constitution information, option information supplementing the IO request 7300 and data for which writing is requested by the IO request 7300, and so forth. Copy constitution information includes the copy type, copy destination storage ID, copy source logical volume ID or virtual volume ID, copy destination storage ID and copy source logical volume ID or virtual volume ID and so forth.

Figure 12:
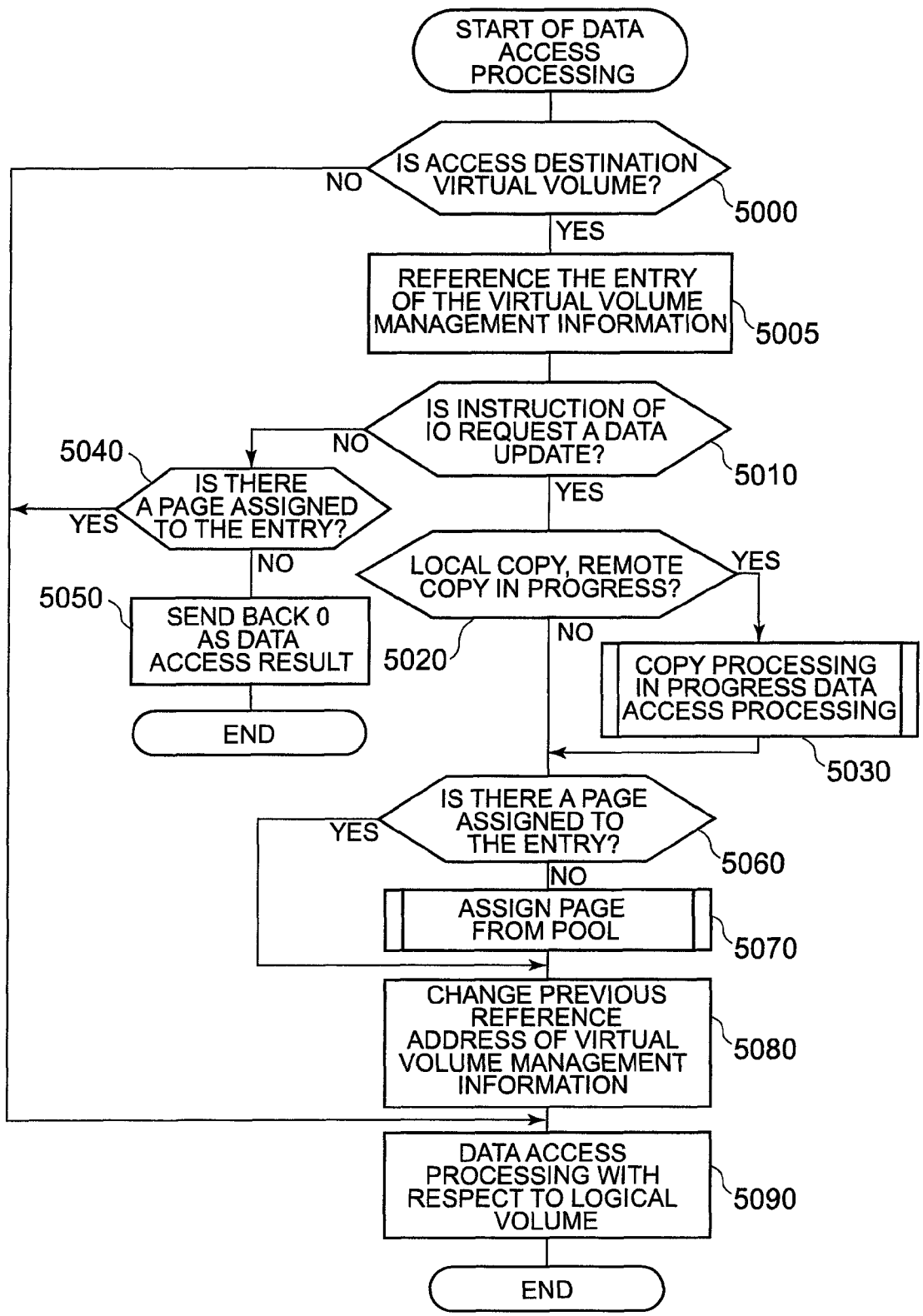
FIG. 12 is a flowchart of data access processing of the storage system.

FIG. 12 is a flowchart for the data access processing of the storage system 300.

Figure 13:
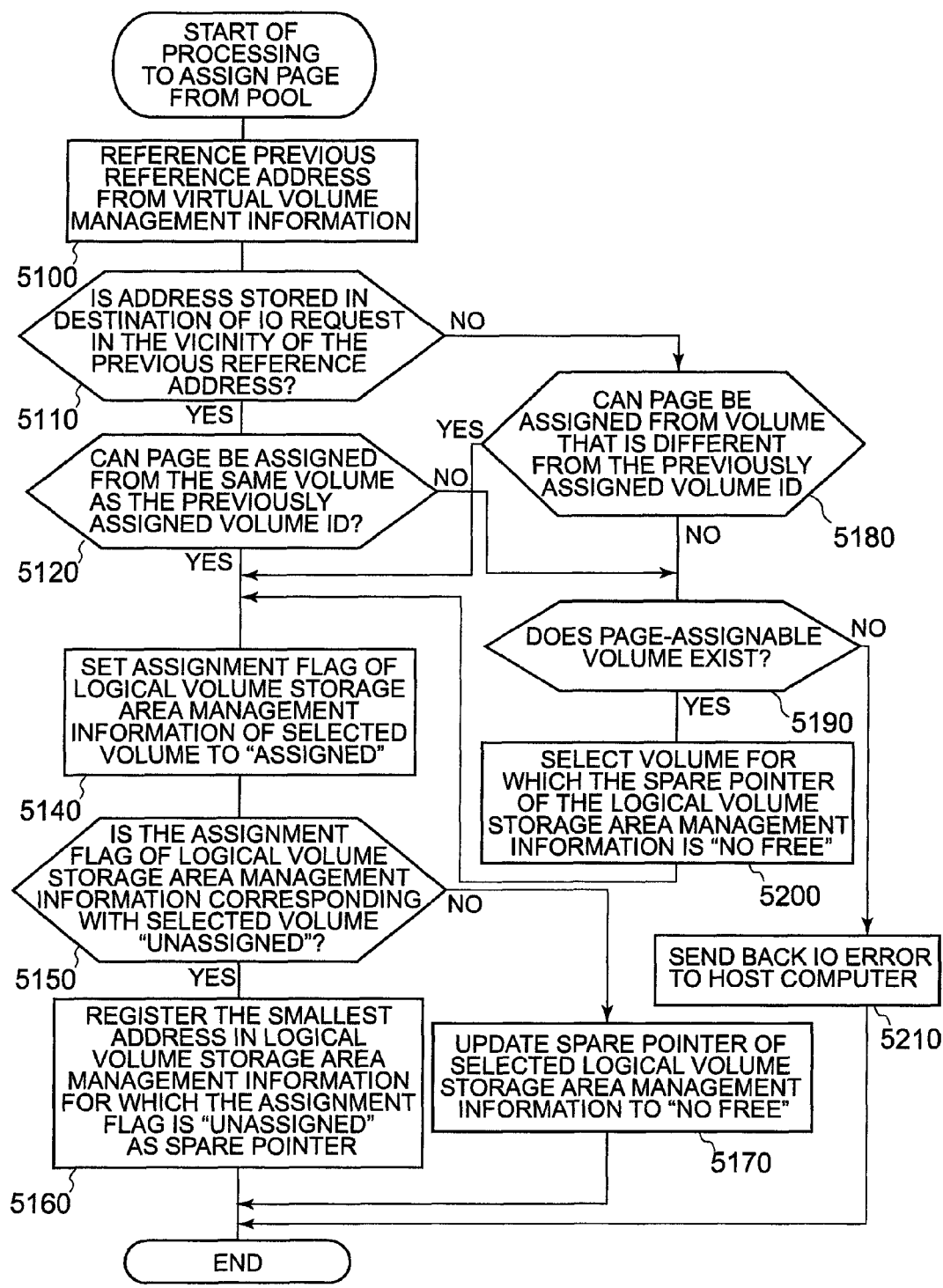
FIG. 13 is a flowchart of the processing that is performed in step 5070 in FIG. 12.

Upon receipt of a data-access instruction IO request 7300 from the host computer 200, the IO controller 1300 of the storage system 300 judges whether the destination 73001 of the IO request 7300 is the virtual volume (step 5000). More specifically, for example, the IO controller 1300 references the destination 73001 of the IO request 7300 and acquires the volume ID contained in the destination 73001. Thereafter, the IO controller 1300 acquires information relating to the logical volume matching the volume ID thus acquired from the volume management information 1250. In cases where the virtual flag 12506 of the volume management information 1250 represents the virtual volume (Yes in step 5000), the IO controller 1300 executes step 5005 and subsequent steps and, in cases where the virtual flag 12506 does not represent the virtual volume (No in step 5000), the controller 1300 executes step 5090. In the description of FIGS. 12 and 13, the virtual volume that corresponds with the acquired volume ID is called the 'virtual volume'.

In step 5005, the IO controller 1300 specifies the virtual volume management information 1270 with the volume ID 12701 that matches the acquired volume ID from among the plurality of virtual volume management information items 1270 (the specified virtual volume management information items 1270 will be referred to as the 'virtual volume management information 1270' in the description of FIGS. 12 and 13 hereinbelow). Thereafter, the IO controller 1300 specifies the virtual address 12704 that matches the volume address contained in the destination 73001 of the IO request 7300 (called the 'volume address' in the description of FIGS. 12 and 13 hereinbelow) from the virtual volume management information 1270. The IO controller 1300 references the virtual address entry that corresponds with the specified virtual address 12704 (the virtual address entry is an entry that is constituted by the logical address pointer 12705 and update flag 12706).

The IO controller 1300 checks whether the instruction content 73002 of the IO request 7300 is a data update (step 5010). When the instruction content 73002 is indeed a data update (Yes in step S5010), the IO controller 1300 also judges whether a local copy or remote copy is being processed in the virtual volume by referencing the copy status information 12102 of the copy pair management information 1210 (the copy status information 12102 that corresponds with the logical volume ID 12101 that matches the acquired volume ID) (step 5020).

In cases where it is judged, as a result of the judgment of step 5020, that a local copy or remote copy is being processed (that the copy status information 12102 is 'copy in progress') (Yes in step 5020), the IO controller 1300 effects data access processing during copy processing (step 5030). The data access processing in the copy processing will be described subsequently.

In cases where it is judged, as a result of the judgment in step 5020, that a local copy or remote copy is not being processed (No in step 5020) or after the end of data access processing during copy processing (step 5030), the IO controller 1300 references the logical address pointer 12705 in the virtual address entry (step 5060). In cases where the result of this referencing is that the logical address pointer 12705 is 'free' (No in step 5060), the IO controller 1300 carries out processing to assign a page from the pool (step 5070). The details of step 5070 will be provided subsequently.

After the processing to assign a page from the pool (step 5070) or in cases where the logical address pointer 12705 is not 'free' in the judgment of step 5060 above (Yes in step 5060), the IO controller 1300 substitutes the previous reference address 12702 of the virtual volume management information 1270 with the volume address (virtual address) contained in the destination 73001 of the IO request 7300 (step 5080).

Here, in cases where the instruction content 73002 of the IO request 7300 is a data reference in the judgment of step 5010 (NO in step 5010), the IO controller 1300 references the logical address pointer 12705 of the virtual address entry. In cases where the result of this referencing is that the logical address pointer 12705 is 'free' (No in step 5040), the IO controller 1300 sends back the data fragment "0" to the host computer 200 when the result of the data referencing by the IO request 7300 is "0" (that is, when a data fragment representing "0" is read) (5050), and ends the data access processing.

Thereafter, in cases where the processing of step 5080 has ended or the logical address pointer 12705 is not 'free' in the judgment of step 5040 (Yes in step 5040), the IO controller 1300 effects data access processing (step 5090) with respect to the logical volume (virtual volume or real volume). In cases where the logical volume represented by the destination 73001 of the IO request 7300 is the virtual volume in the data access processing with respect to the logical volume, the IO controller 1300 accesses the page which is specified by the logical address pointer 12705 of the virtual address entry. Further, in cases where the logical volume represented by the destination 73001 of the IO request 7300 is a real volume, the IO controller 1300 accesses the real area specified by the volume address of the destination 73001.

An example of the flow of data access processing was described above. In the description of FIG. 12, the processing performed by the IO controller 1300 can be carried out by the processor 1310 which executes the input/output process program 1240, for example. The processor 1310 is able to execute virtual volume-related processing by executing the virtual volume processing program 1220.

FIG. 13 is a flowchart of the flow of processing that is performed in step 5070 in FIG. 12 (processing to assign a page from the pool).

The IO controller 1300 of the storage system 300 specifies the address of the previous access destination virtual area of the virtual volume (called the 'previous address' hereinbelow) from the previous reference address 12702 of the virtual volume management information 1270 (step 5100).

Thereafter, the IO controller 1300 compares the specified previous address and the volume address and judges whether the two addresses neighbor one another (whether the volume address is equal to or less than the length of one page area before and after the previous address) (step 5110).

The judgment of step 5110 is carried out for the following reasons, that is, in cases where two or more consecutive virtual areas are accessed, sequential access to the real volume is permitted by assigning consecutive pages of the same real volume in the pool (the page internal is equal to or less than the number of predetermined pages even when the pages are not consecutive) and in cases where discrete virtual areas are accessed, this judgment is carried out in order to enable parallel data access through the assignment of pages from different real volumes in the pool. As a result, the data access characteristic of a logical volume for which the majority of the data detected once can be accessed in a short time (strictly speaking, the hard disk drives constituting the logical volume) can be obtained.

Here, in cases where the result of the judgment of step 5110 is that the volume address and previous address neighbor one another (Yes in step 5110), the IO controller 1300 specifies the pool management information 1290 from the pool ID 12701 of the virtual volume management information 1270 and references the previously assigned volume ID 12906 of the pool management information 1290. Thereafter, the IO controller 1300 references the free pointer 12903 of the logical volume storage area management information in which same volume ID as the previously assigned volume ID is stored and judges whether the free pointer 12903 indicates a 'no free' status (step 5120).

However, in cases where the result of the judgment of step 5110 is that the volume address and the previous address do not neighbor one another (No in step 5110), the IO controller 1300 specifies the pool management information 1290 from the pool ID 12701 of the virtual volume management information 1270 and references the previously assigned volume ID 12906 of the pool management information 1290. Thereafter, the IO controller 1300 judges whether logical volume storage area management information representing the fact that the free pointer 12903 is 'no free' exists in two or more logical volume storage area management information items in which a different volume ID from the previously assigned volume ID is stored (step 5180).

In cases where the result of the judgment of step 5180 is that there is logical volume storage area management information such that the free pointer 12903 is not 'no free' (Yes in step 5180), the IO controller 1300 optionally selects one logical volume storage area management information item if there are a plurality of such logical volume storage area management information items. In addition, in cases where the result of step 5120 is that the free pointer 12903 of the logical volume storage area management information in which the same volume ID as the previously assigned volume ID is stored is not 'no free' (Yes in step 5120), the IO controller 1300 selects the logical volume storage area management information.

Thereafter, the IO controller 1300 updates the assignment flag 12905 that corresponds to the address 12904 indicated by the free pointer 12903 of the logical volume storage area management information selected in cases where step 5180 yields a Yes or step 5120 yields a Yes to information indicating 'assignment made' (step 5140).

Thereafter, the IO controller 1300 searches for an assignment flag 12905 that indicates 'no assignment' and corresponds to an address 12904 with as small a value as possible in the logical volume storage area management information thus selected (step 5150).

Here, if, as a result of the search of step 5150, an assignment flag 12905 that indicates 'no assignment' is found from the selected logical volume storage area management information (Yes in step 5150), the IO controller 1300 updates the free pointer 12903 to information represented by the address 12904 that corresponds to the assignment flag 12905 thus found (step 5160).

However, if, as a result of the judgment of step 5150, an assignment flag 12905 that indicates 'no assignment' is not found from the selected logical volume storage area management information (No in step 5150), the IO controller 1300 updates the free pointer 12903 of the selected storage area management information to information indicating 'no free'.

In cases where the judgment of either of steps 5120 and 5180 yields a 'No', the IO controller 1300 searches for logical volume storage area management information for which the free pointer 12903 is not 'no free' (step 5190).

In cases where, as a result of the search in step 5190, logical volume storage area management information for which the free pointer 12903 is not 'no free' is found (Yes in step 5190), the IO controller 1300 selects the logical volume storage area management information thus found and effects the step 5140 and subsequent steps.

If, as a result of the search of step 5190, logical volume storage area management information for which the free pointer 12903 is not 'no free' is not found (No in step 5190), the IO controller 1300 reports the error with the IO request 7300 to the host computer 200 and ends the data access processing of the IO request 7300.

An example of the flow of the page assignment processing was provided hereinabove. In the description of FIG. 13, the processing performed by the IO controller 1300 can be performed by the processor 1310 that executes the input/output process program 1240, for example. The processor 1310 is able to perform virtual volume-related processing by executing the virtual volume processing program 1220.

Virtual volume backup processing will be described next by using FIG. 14.

Figure 14:
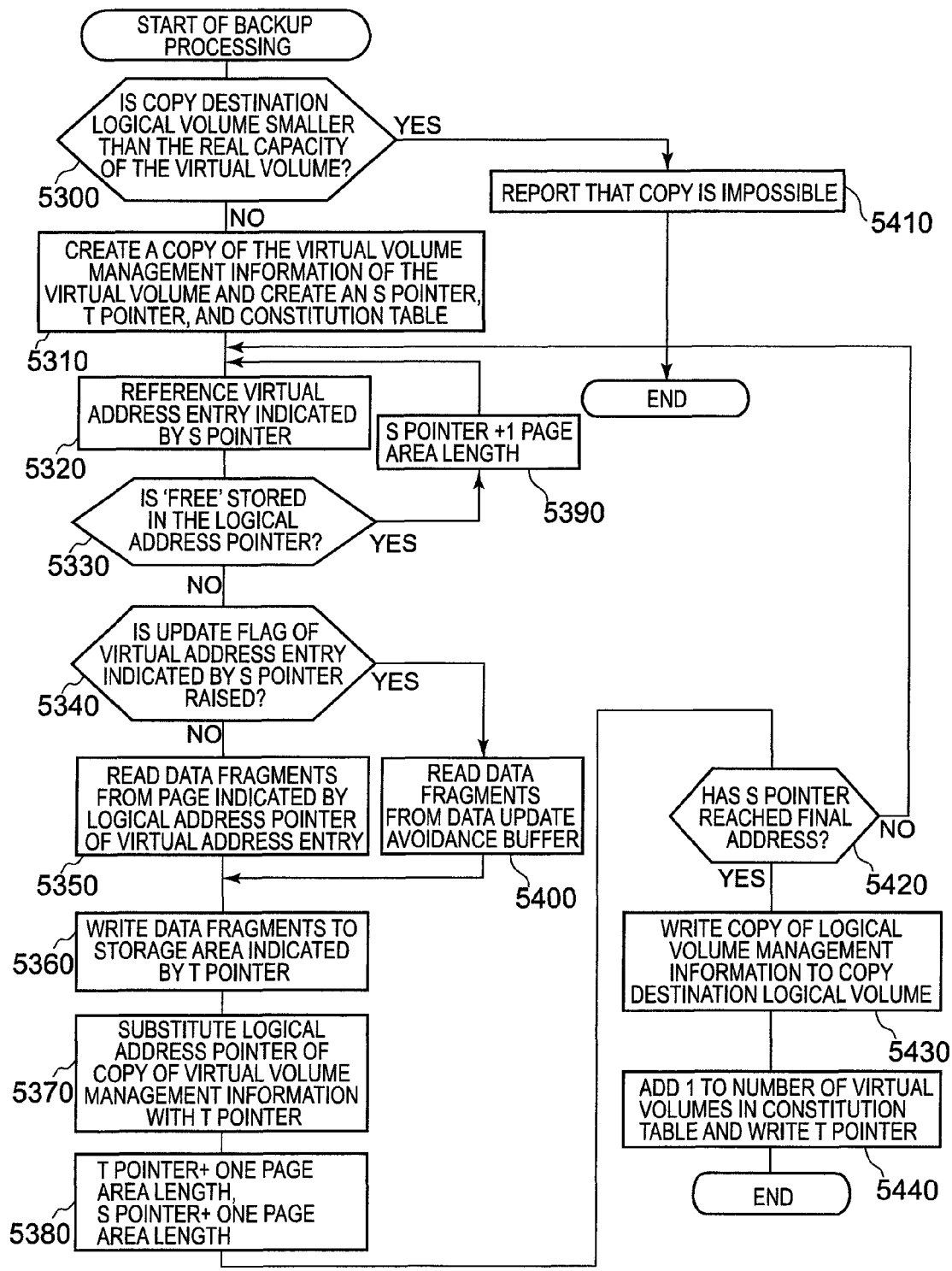
FIG. 14 is a flowchart of the virtual volume backup processing of the storage system.

FIG. 14 is a flowchart of the virtual volume backup processing of the storage system 300.

Upon receipt of the copy control instruction of the IO request 7300 from the management computer 100 (the instruction content 73002 is 'local copy new start'), the storage system 300 starts the virtual volume backup processing. In the description of FIG. 14 hereinbelow, the IO request 7300 is referred to as the 'copy IO request 7300' and the backup target virtual volume is called 'the virtual volume'.

The IO controller 1300 judges whether the real capacity of the virtual volume (the total storage capacity of one or more pages assigned to the virtual volume) is smaller than the storage capacity of the copy destination logical volume (step 5300). More specifically, for example, the IO controller 1300 counts the number of virtual address entries for which the logical address pointer 12705 is not 'free' in the virtual volume management information 1270 that corresponds to the virtual volume (called 'the virtual volume management information 1270' in the description of FIG. 14 hereinbelow). Thereafter, the IO controller 1300 calculates the real capacity of the virtual volume by adding page capacity (page storage capacity) to the number of virtual address entries. In addition, the IO controller 1300 compares the storage capacity of the copy destination logical volume (the storage capacity that is specified by the capacity 12503 of the volume management information 1250 which corresponds to the logical volume) with the real capacity of the virtual volume (step 5300).

In cases where the result of the judgment of the step 5300 is that the real capacity of the virtual volume is smaller than the storage capacity of the copy destination logical volume (Yes in step 5300), the IO controller 1300 issues a message indicating the fact that a copy is impossible to the management computer 100.

Furthermore, in cases where the result of the judgment of step 5300 is that the real capacity of the virtual volume is equal to or more than the storage capacity of the copy destination logical volume (No in step 5300), the IO controller 1300 creates a copy of the virtual volume management information 1270 and stores same in the memory 1330 of the IO controller 1300. Moreover, the IO controller 1300 stores an S pointer 1391, T pointer 1392, and constitution table 1393 in the memory 1330 of the IO controller 1300 (step 5310).

Figure 17:
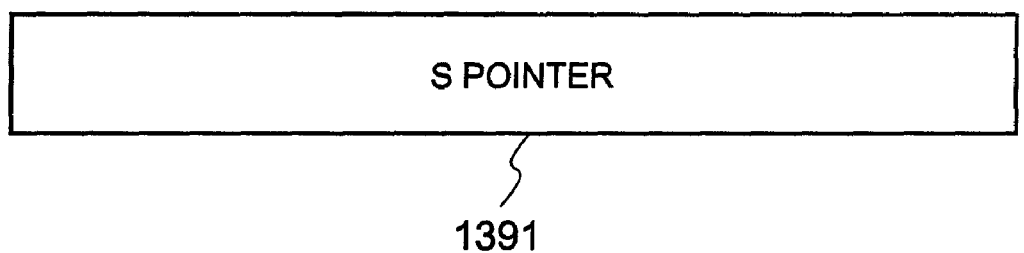
FIG. 17 is a constitutional view of an S pointer.
Figure 18:
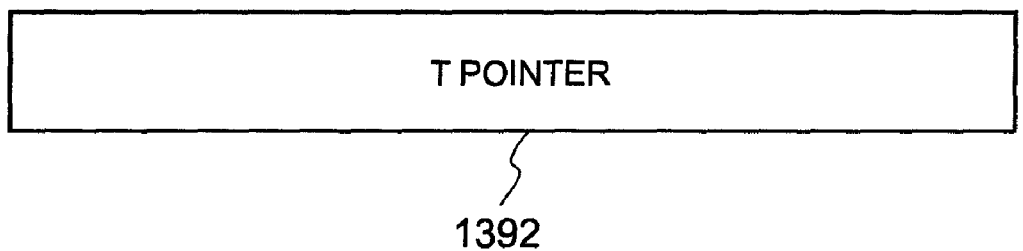
FIG. 18 is a constitutional view of a T pointer.

Here, the S pointer 1391 is a pointer that indicates any virtual address entry in the address map in the virtual volume management information 1270 (for example, the S pointer 1391 indicates a virtual address entry that corresponds with the virtual address 12704 by indicating the virtual address 12704). A copy of the virtual volume is completed from the virtual area corresponding with the leading virtual address entry of the address map to the virtual area which corresponds with the virtual address entry represented by the S pointer 1391. The initial value of the S pointer 1391 indicates the leading virtual address entry (virtual address 12704). However, the T pointer 1392 is a pointer that indicates the address of the copy destination real area nearest to the copy destination logical volume. The initial value of the T pointer 1392 indicates the address of the leading real area of the copy destination logical volume. The S pointer 1391 and T pointer 1392 are shown in FIGS. 17 and 18 respectively.

In addition, the constitution table 1393 is information that manages a list of the virtual volumes which are the copy source of the data fragments saved in the copy destination logical volume. An example of the constitution of the constitution table 1393 is shown in FIG. 19. The constitution table 1393 includes the number of virtual volumes 13936 and the T pointer 13937. The constitution table 1393 also contains, for each virtual volume which constitutes a copy source of the data fragments saved in the copy destination logical volume, a volume ID (virtual volume identifier) 13931, an OS address (the volume identifier that the host computer 200 assigns to the virtual volume) 13932, the virtual volume capacity 13933, user information (user-related information that is contained in the option 73005 of the IO request 7300, for example) 13934, and a backup pointer (the address of the real area that stores the virtual volume management information 1270 corresponding with the virtual volume in the copy destination logical volume) 13935. In step 5310, the IO controller 1300 adds an entry to the copy pair management information 1210. This entry includes, as the logical volume ID 12101, an identifier that represents the copy source virtual volume; as the copy status information 12102, information indicating that a copy in progress; as the copy target storage ID 12103, an identifier of the storage system 300 that has a copy destination logical volume; as a copy target volume ID 12104, an identifier of the copy destination logical volume; as a copy pair ID 12105, a copy pair ID that is contained in the copy IO request 7300 and, as the copy type 12107, information indicating a local copy.

Thereafter, the IO controller 1300 references the virtual address entry indicated by the S pointer 1391 (step 5320).

The IO controller 1300 next judges whether the logical address pointer 12705 of the referenced virtual address entry is 'free' (step 5330).

In cases where, as a result of the judgment of step 5330, the logical address pointer 12705 is 'free' (Yes in step 5330), the IO controller 1300 makes changes so that the S pointer 1391 indicates the next virtual address entry by adding the page area length (page size) to the S pointer 1391 (5390) and, once again, effects the processing of step 5320.

However, in cases where the result of the judgment of step 5330 is that the logical address pointer 12705 is not 'free' (No in step 5330), the IO controller 1300 references the update flag 12706 of the virtual address entry indicated by the S pointer 1391 and judges whether the update flag 12706 is ON (step 5340). In cases where, while backup processing is in progress, access is made in order to update the data fragments in the virtual volume before copying of the data fragments is complete by way of a local copy, the update flag 12706 indicates whether processing to save the pre-update data fragments in a data update avoidance buffer 1110 is implemented in order to temporarily avoid the data fragments (backup target data fragments). By avoiding pre-update data fragments before same are copied to the data update avoidance buffer 1110, all the data fragments that exist in the virtual volume directly after backup disclosure (when the copy IO request 7300 is received) can be copied.

FIG. 20 shows an example of a data update avoidance buffer. The data update avoidance buffer 1110 stores, for each of the data fragments that have been saved, the address 1102 of the virtual area that corresponds to the save source page of the data fragment, the virtual volume ID 11101 that comprises the virtual area, and the saved data fragment 11103.

In cases where the result of the judgment of step 5340 is that the update flag 12706 has been raised (Yes in step 5340), the IO controller 1300 reads data fragments that correspond with the virtual address entry indicated by the S pointer 1391 from the data update avoidance buffer 1110. The IO controller 1300 resets (that is, cancels) the update flag 12706 after reading the data fragments from the data update avoidance buffer 1110 (step 5400).

However, in cases where the result of the judgment of step 5340 is that the update flag 12706 is not raised (No in step 5340), the IO controller 1300 reads data fragments from the page specified by the virtual address entry indicated by the S pointer 1391 (step 5350).

Thereafter, the IO controller 1300 writes data fragments that were read in step 5340 or 5350 to a real area of the copy destination logical volume indicated by the T pointer 1392 (step 5360).

Subsequently, in the duplication of the virtual volume management information 1270 created in step 5310, the IO controller 1300 substitutes the logical address pointer 12705 of the virtual address entry indicated by the S pointer 1391 with the address of the real area represented by the T pointer 1392 (step 5370).

Thereafter, the IO controller 1300 updates the S pointer 1391 and T pointer 1392 by adding a value that corresponds to one page area length (that is, an address value that corresponds to the size of the page) to the S pointer 1391 and the T pointer 1392 respectively (step 5380).

Thereafter, the IO controller 1300 judges whether the updated S pointer 1391 represents the final virtual address entry of the virtual volume management information 1270 (step 5420).

In cases where, as a result of the judgment of step 5420, the S pointer 1391 has not reached the final virtual address entry (No in step 5420), the IO controller 1300 executes the processing of step 5320.

However, in cases where the result of the judgment of step 5420 is that the S pointer 1391 has reached the final virtual address entry, the IO controller 1300 writes a copy of the virtual volume management information 1270 to the real area indicated by the T pointer 1392 of the copy destination logical volume (step 5430).

Finally, in cases where the IO controller 1300 adds one to the number 13936 of virtual volumes in the constitution table 1393, adds an address value corresponding to the area length of the copy of the virtual volume management information 1270 (that is, corresponding to the size thereof) to the T pointer 1392 and stores the updated T pointer 1392 as the T pointer 13937 of the constitution table 1393 (step 5440) before updating the copy status information 12102 of the copy pair management information 1210 during copy suspension and ending the processing.

Virtual volume backup processing was described hereinabove. In the description of FIG. 14, the processing that is carried out by the IO controller 1300 can be performed by the processor 1310 that executes the copy processing program 1230, for example. The processor 1310 is able to execute the virtual volume processing program 1220 with respect to virtual volume-related processing.

In cases where access with the purpose of updating the data fragments in the virtual volume occurs during processing to backup the virtual volume, the pre-update data fragments are saved to the data update avoidance buffer 1110. This processing is required in the data access processing shown in FIG. 12 (step 5030).

Data access processing during copy processing will be described here by using FIG. 15.

Figure 15:
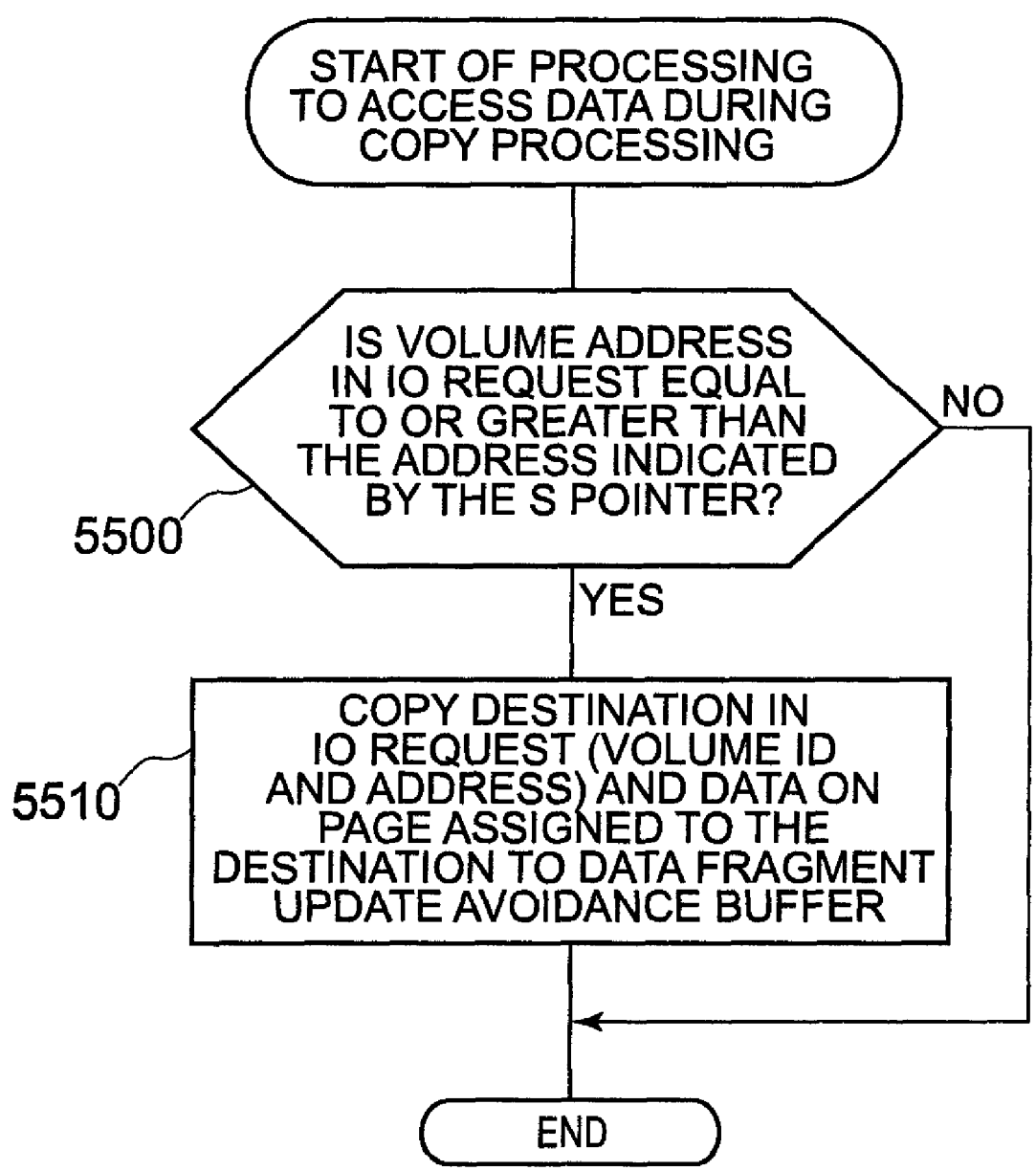
FIG. 15 is a flowchart of data access processing during copy processing of the storage system.

FIG. 15 is a flowchart of data access processing during copy processing of the storage system.

The IO controller 1300 compares the virtual address represented by the S pointer 1391 and the volume address contained in the destination 73001 of the IO request 7300 (step 5500).

In cases where the result of the judgment of step 5500 is that the virtual address indicated by the S pointer 1391 is greater than the volume address in the IO request 7300 (No in step 5500), the IO controller 1300 ends the data access processing. This is because the data fragments on the page assigned to the virtual area of the access destination represented by the volume address have been copied.

In cases where the result of the judgment of step 5500 is that the virtual address represented by the S pointer 1391 is less than the volume address in the IO request 7300, the IO controller 1300 executes step 5510. This is because the data fragments on the page assigned to the virtual area of the access destination represented by the volume address have not yet been copied to the copy destination logical volume.

In step 5510, the IO controller 1300 specifies the page assigned to the access destination virtual area represented by the volume address in the IO request 7300 by referencing the virtual volume management information 1270, reads data fragments stored in the specified page, and raises the update flag 12706 of the virtual address entry which corresponds with the virtual area. In addition, the IO controller 1300 writes the data fragments read as the volume ID and volume address of the IO request 7300 to the data update avoidance buffer 1110.

Data access processing during copy processing was described hereinabove. In the description of FIG. 15, the processing performed by the IO controller 1300 can be performed by the processor 1310 that executes the input/output process program 1240, for example. The processor 1310 is able to execute virtual-volume related processing by executing the virtual volume processing program 1220.

After copying the data fragments on a page that corresponds to the real capacity of the virtual volume and virtual volume management information 1270 that corresponds with the virtual volume to the copy destination logical volume, the storage system 300 is able to make a copy of data fragments on a page that corresponds to the real capacity of another virtual volume and of virtual volume management information 1270 that corresponds with the other virtual volume to the copy destination logical volume. This processing will be referred to as 'additional backup processing' hereinbelow. The additional backup processing will be described using FIG. 16.

Figure 16:
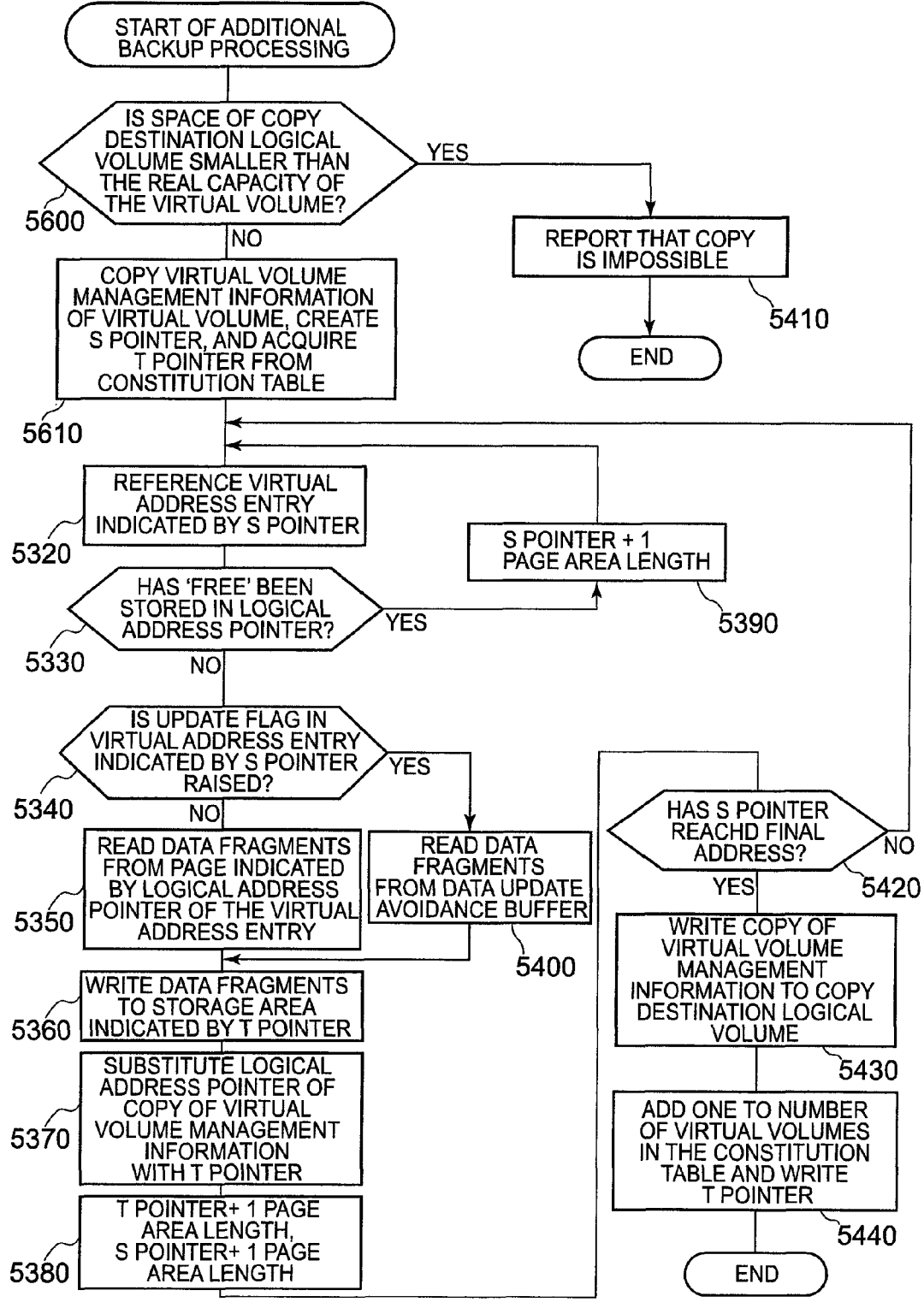
FIG. 16 is a flowchart of additional backup processing of the storage system.

FIG. 16 is a flowchart of the additional backup processing.

The storage system 300 starts the additional backup processing upon receipt of a copy control instruction of an IO request from the management computer 100 (the instruction content 73002 is 'local copy addition').

The additional backup processing has much in common with the virtual volume backup processing described with reference to FIG. 14. The only steps that differ from the former backup processing are steps 5300 and 5310. Hence, the differences will be mainly described hereinbelow and a description of the common points is omitted or simplified (the same numbers as the numbers assigned to the steps performed by substantially the same processing as FIG. 14 have been assigned to the respective steps in FIG. 16).

The IO controller 1300 judges whether the real capacity of the virtual volume which constitutes the backup target of the additional backup processing (called the 'additional virtual volume' hereinbelow) is smaller than the free capacity of the copy destination logical volume (step 5300). The free capacity of the logical volume is calculated from the T pointer 13937 of the constitution table 1393 that corresponds with the copy destination logical volume and the storage capacity of the copy destination logical volume (the storage capacity represented by the capacity 12403 of the volume management information 1250 which corresponds with the copy destination logical volume). Thereafter, the IO controller 1300 compares the real capacity of the additional virtual volume with the free capacity of the copy destination logical volume (step 5600).

In cases where the result of the judgment of step 5600 is that the real capacity of the additional virtual volume is equal to or more than the free capacity of the copy destination logical volume (Yes in step 5600), the IO controller 1300 creates a copy of the virtual volume management information 1270 that corresponds with the additional virtual volume and stores the copy in the memory 1330 of the IO controller 1300. The IO controller 1300 also stores the S pointer 1391 in the memory 1330. In addition, the IO controller 1300 reads the T pointer from the created constitution table 1393 that is stored in the memory 1330 of the IO controller 1300. Thereafter, the IO controller 1300 adds an entry to the copy pair management information 1210. The additional entry includes the ID 12101 of the additional virtual volume, the ID 12103 of the storage system that comprises the copy destination logical volume, and the ID 12014 of the copy destination logical volume. Moreover, the IO controller 1300 also includes an IO request in progress copy pair ID 12105, a copy type 12107 that represents a local copy, copy status information 12102 that indicates copy in progress in the added entry (step 5610).

The processing that is performed after step 5610 and the processing that is carried out in cases where step 5600 yields a YES have been described with reference to FIG. 14 and will therefore not be described here.

According to the first embodiment, in cases where a backup of the virtual volume to the copy destination logical volume is completed, a procedure for completing the backup to the copy destination logical volume must be carried out.

The procedure for completing the backup to the copy destination logical volume will be called 'copy destination logical volume close processing' hereinbelow.

Figure 21:
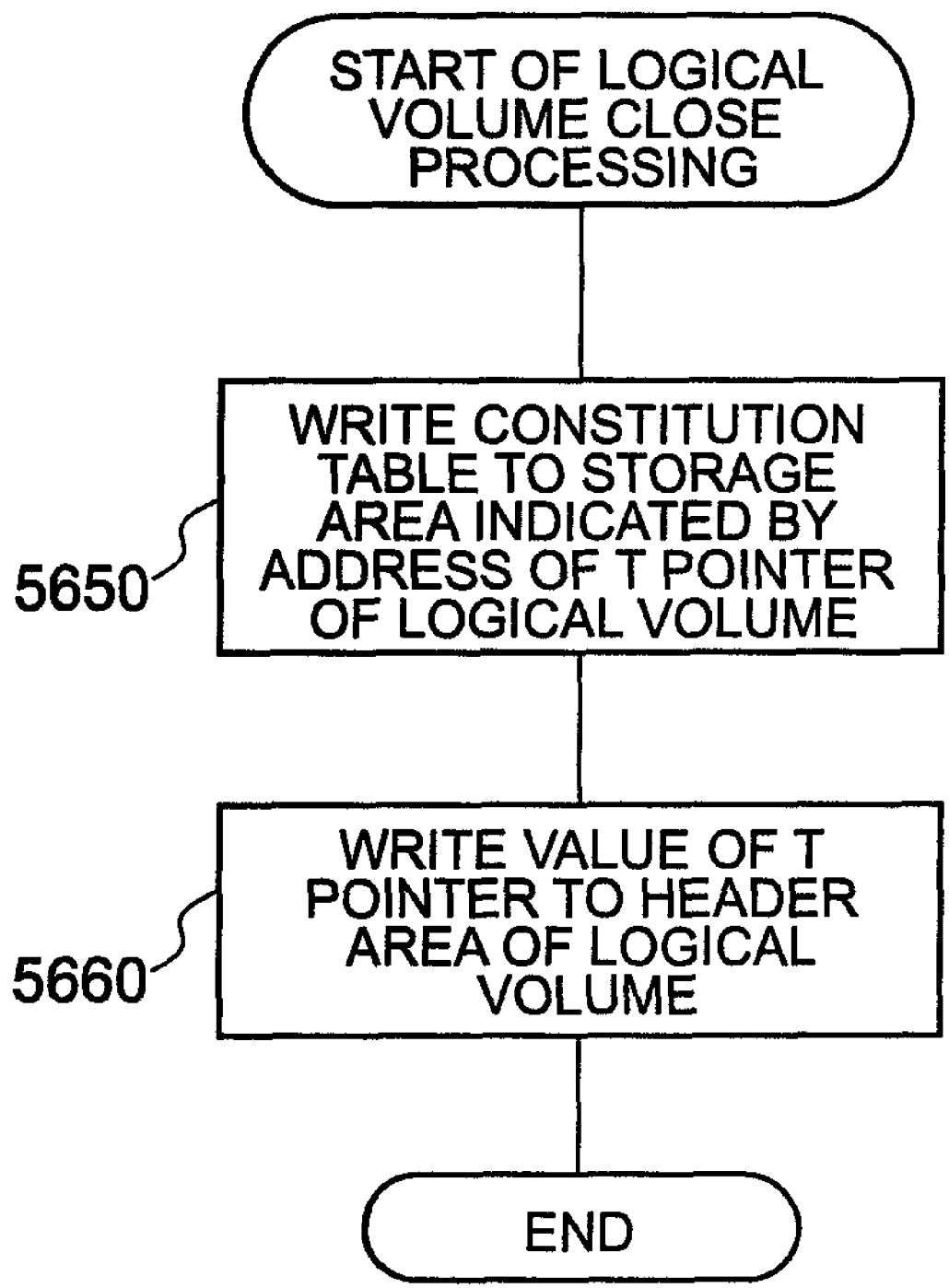
FIG. 21 is a flowchart for logical volume close processing of the storage system.

FIG. 21 is a flowchart for copy destination logical volume close processing.

The storage system 300 starts logical volume close processing upon receipt of a copy control instruction of an IO request from the management computer 100 (the instruction content 73002 is 'local copy close'). The IO request designates the copy destination logical volume which is to be the target of the close processing (called the 'close target volume' hereinbelow).

The IO controller 1300 acquires the T pointer 13937 from the constitution table 1393 stored in the memory 1330 (the constitution table 1393 that corresponds with the close target volume). Thereafter, the IO controller 1300 writes the constitution table 1393 to a real area in the close target volume which is a real area that corresponds with the address indicated by the T pointer thus acquired (step 5650).

Thereafter, the IO controller 1300 writes the acquired T pointer (in other words, the write destination address of the constitution table 1393) to the header area which is an area that can be employed only by the storage system 300 in the close target volume (in other words, an area that has not been designated by the host computer 200) (step 5660). Thereafter, the IO controller 1300 deletes the entry (entry including the ID of the close target volume) from the copy status information 12102 of the copy pair management information 1210 and ends the processing.

In the close processing, although the address that represents the location of the constitution table 1393 is written to the header area of the close target volume, in cases where it is not possible to use the header area, a method that does not employ the header area may be used. For example, in step 5650, the address indicated by the T pointer is not utilized. A specified address (the leading address or final address of the close target volume, or the like, for example) may be used.

Figure 31:
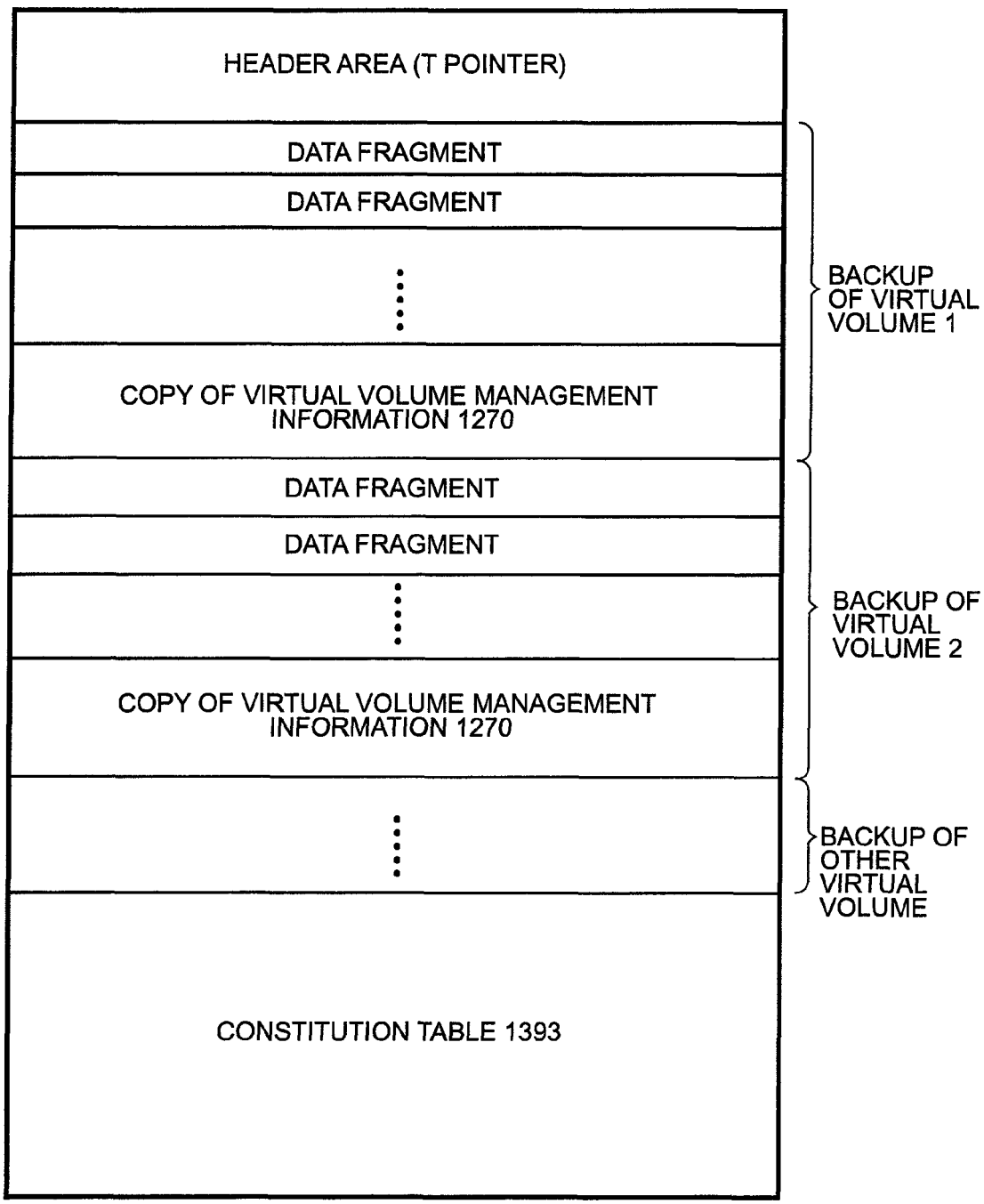
FIG. 31 shows a data constitutional example in the copy destination logical volume at the time the close processing is complete according to the first embodiment of the present invention.

The data positioning of the close target volume following the end of close processing is shown in FIG. 31. As can be seen from FIG. 31, one or more data fragments in an amount that corresponds to the real capacity of the virtual volume are sequentially arranged in the close target volume. A copy of the virtual volume management information 1270 that corresponds with the virtual volume is arranged starting from a storage area adjacent to the real area in which data fragments the ends of which are sequentially arranged have been stored. Further, in cases where additional backup processing is performed (in other words, in cases where a plurality of virtual volumes are backed up to the close target volume), one or more data fragments in an amount that corresponds to the real capacity of another virtual volume are sequentially arranged as mentioned earlier starting with the next real area that comprises the copy of the virtual volume management information 1270. A constitution table 1393 is written starting with the next storage area for the copy of the data fragments of one or more virtual volumes and of the virtual volume management information 1270. A free storage area may be produced between the terminating storage area of the plurality of storage areas that is occupied by the constitution table 1393 and the terminating storage area of the logical volume.

Processing that allows data fragments stored in an optional virtual volume to be taken from a logical volume for which close processing is complete the data fragments to be accessed by the host computer and allows the data fragments to be accessed by the host computer exists. This is called restore processing. Restore processing can be classified as two processes such as restore preparatory processing and restore base processing. Restore preparatory processing is processing to obtain a constitution table 1393 from the close target volume. Restore base processing is processing that involves making it possible to take data fragments stored in an optional virtual volume from a close target volume using the constitution table 1393 thus obtained and to access these data fragments from the host computer 200.

First, restore preparatory processing will be described.

Figure 22:
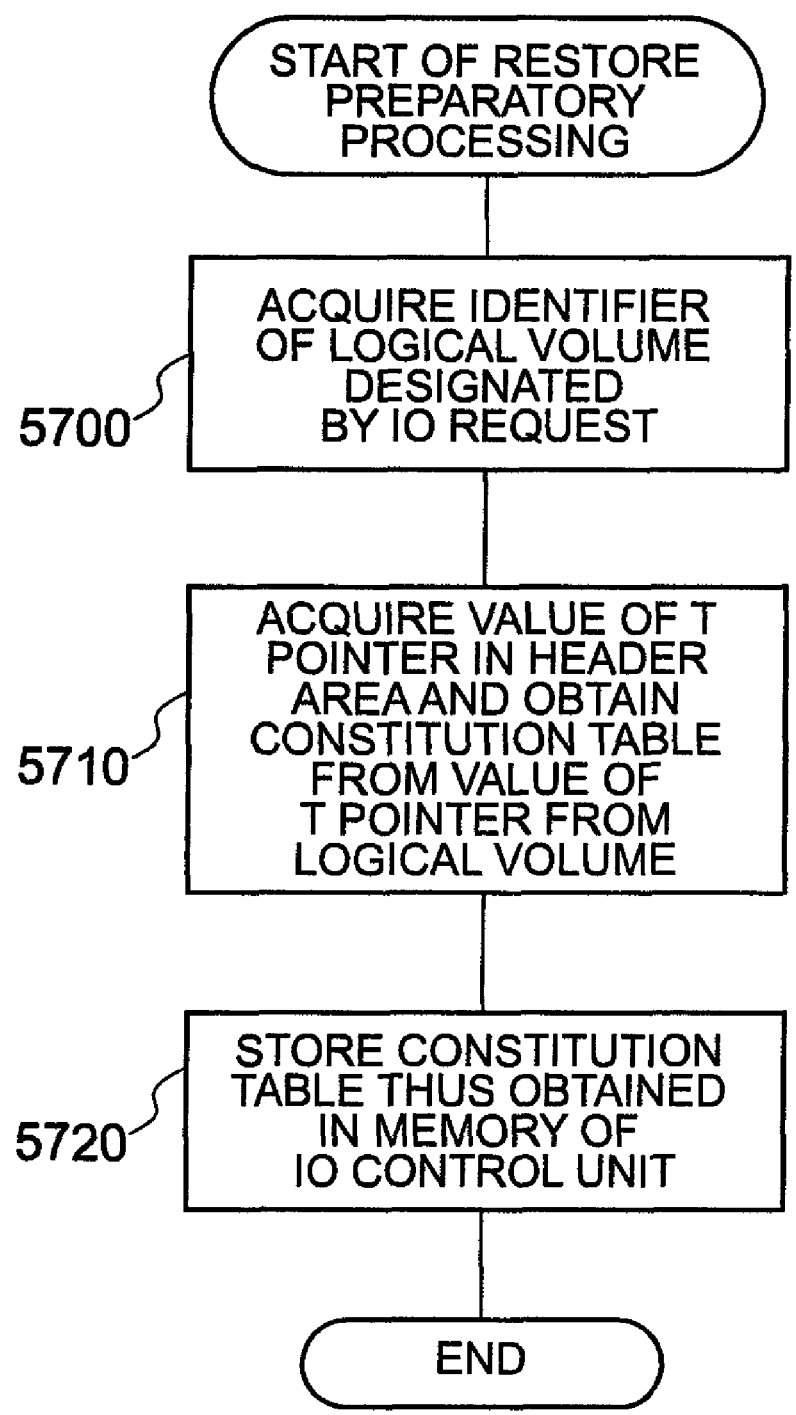
FIG. 22 is a flowchart of the restore preparatory processing of the storage system.

FIG. 22 is a flowchart of restore preparatory processing of the storage system 300.

The storage system 300 starts virtual volume restore preparatory processing upon receipt of a copy control instruction (instruction content 73002 is 'restore preparations') of an IO request from the management computer 100.

The IO controller 1300 specifies an identifier of the logical volume based on the copy constitution information stored in the option 73005 of the IO request designating the restore preparations (step 5700).

The IO controller 1300 acquires a T pointer that is stored in the header area of the logical volume that corresponds with the specified identifier ('restore source logical volume' hereinbelow). The IO controller 1300 then acquires the constitution table 1393 from the location specified by the T pointer (the storage area of the restore source logical volume) (step 5710).

The IO controller 1300 stores the acquired constitution table 5710 in the memory 1330 of the IO controller 1300 (5720).

As a result of the above restore preparatory processing, the storage system 300 is able to obtain a constitution table 1393 from the restore source logical volume. In the description of FIG. 22, the processing that is performed by the IO controller 1300 can be carried out by the processor 1310 that executes the input/output process program 1240, for example.

The restore base processing will be described next. In this embodiment, restore base processing of two types, namely, high-speed restore base processing and normal restore base processing exist. High-speed restore base processing is processing that takes only a copy of the virtual volume management information 1270 from the restore source logical volume. Normal restore base processing is processing that takes not only the copy of the virtual volume management information 1270 but also data fragments from the restore source logical volume. High-speed restore base processing is processing that is completed at a high speed but which does not allow the data fragments to be updated with respect to the virtual volume constituting the restore destination. However, the normal restore base processing allows data fragments to be updated for the restore destination virtual volume but whose processing takes longer than the high-speed restore base processing.

Figure 23:
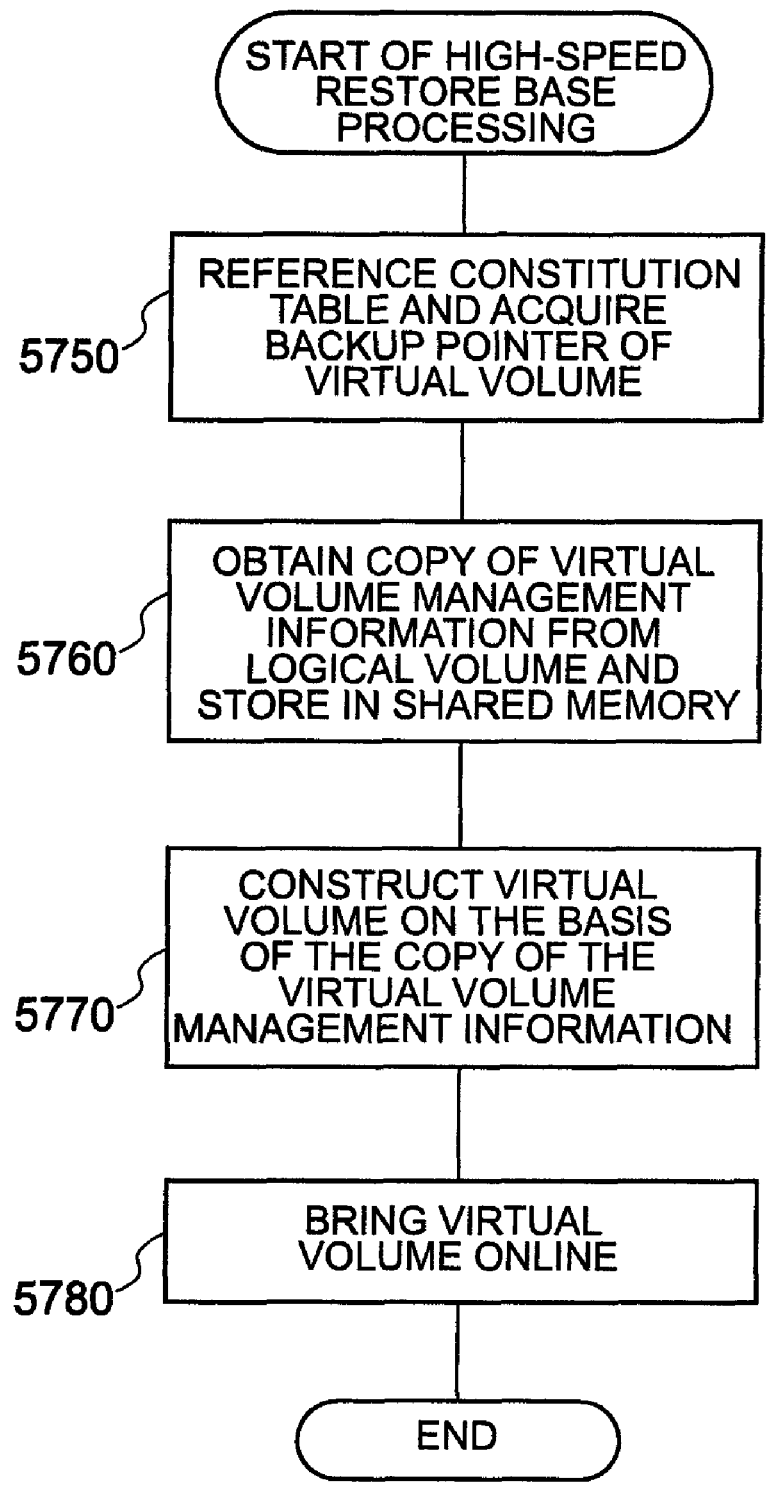
FIG. 23 is a flowchart of high-speed restore base processing of the storage system.

FIG. 23 is a flowchart of high-speed restore base processing of the storage system 300.

The storage system 300 starts the high-speed restore base processing with respect to the virtual volume upon receipt of a copy control instruction of the IO request from the management computer 100 (the instruction content 73002 is 'high-speed restore').

The IO controller 1300 acquires the identifier of the restore destination virtual volume that is contained in option 73005 of the IO request and acquires the backup pointer 13935 that corresponds with the volume ID 13931 that matches the identifier (volume ID 13931 of the constitution table 1383 stored in memory 1330 of the IO controller 1300) (step 5750).

Thereafter, the IO controller 1300 acquires a copy of the virtual volume management information 1270 stored in the storage area indicated by the acquired backup pointer 13935

(storage area of the restore source logical volume) from the restore source logical volume and stores a copy of the acquired virtual volume management information 1270 in the shared memory 1200 (step 5760).

Thereafter, the IO controller 1300 is able to utilize the restore destination virtual volume based on the copy of the virtual volume management information 1270 (step 5770). More specifically, for example, the IO controller 1300 validates the virtual flag 12506 that corresponds with the volume ID 12501 that matches the identifier of the restore destination virtual volume (the logical volume ID 12501 of the volume management information 1250) and updates the volume status 12502 corresponding with the ID 12501 from 'unmounted' to 'normal'.

Thereafter, the IO controller 1300 brings the restore destination virtual volume online (step 5780). More specifically, for example, the IO controller 1300 establishes a logical path that links the host computer 200 and the restore destination virtual volume. When the logical path is established, access to the restore destination virtual volume by the host computer 200 is possible. For example, the storage system 300 sends back a response to the effect that the virtual volume exists in response to a SCSI status acquisition request or a channel status request or the like from the host computer. As a result, the host computer 200 identifies the fact that a logical volume exists in the storage system 300 and registers information relating to the logical volume thus identified (the identifier, for example) to a data accessible volume list (volume list information that is managed by the OS of the host computer 200, for example).

An example of the flow of high-speed restore base processing was provided hereinabove. In the description of FIG. 23, the processing that is carried out by the IO controller 1300 can be performed by the processor 1310 that executes the input/output process program 1240, for example.

The IO controller 1300 accepts read requests from the host computer 200 with respect to a virtual volume that can be accessed by the high-speed restore processing ('high-speed restore virtual volume' hereinbelow) but does not accept write requests from the host computer 200. More specifically, for example, in cases where a read request that designates a high-speed restore virtual volume is received, the IO controller 1300 specifies the storage area which corresponds with the virtual area designated by the read request from the address map of the copy of the virtual volume management information 1270 corresponding with the high-speed restore virtual volume (information stored in the shared memory 1200), reads data fragments from the specified storage area (storage area of the restore source logical volume) and transmits the data fragments to the host computer 200. However, in cases where a write request that designates the high-speed restore virtual volume is accepted, for example, the IO controller 1300 sends back an error to the host computer 200.

Figure 24:
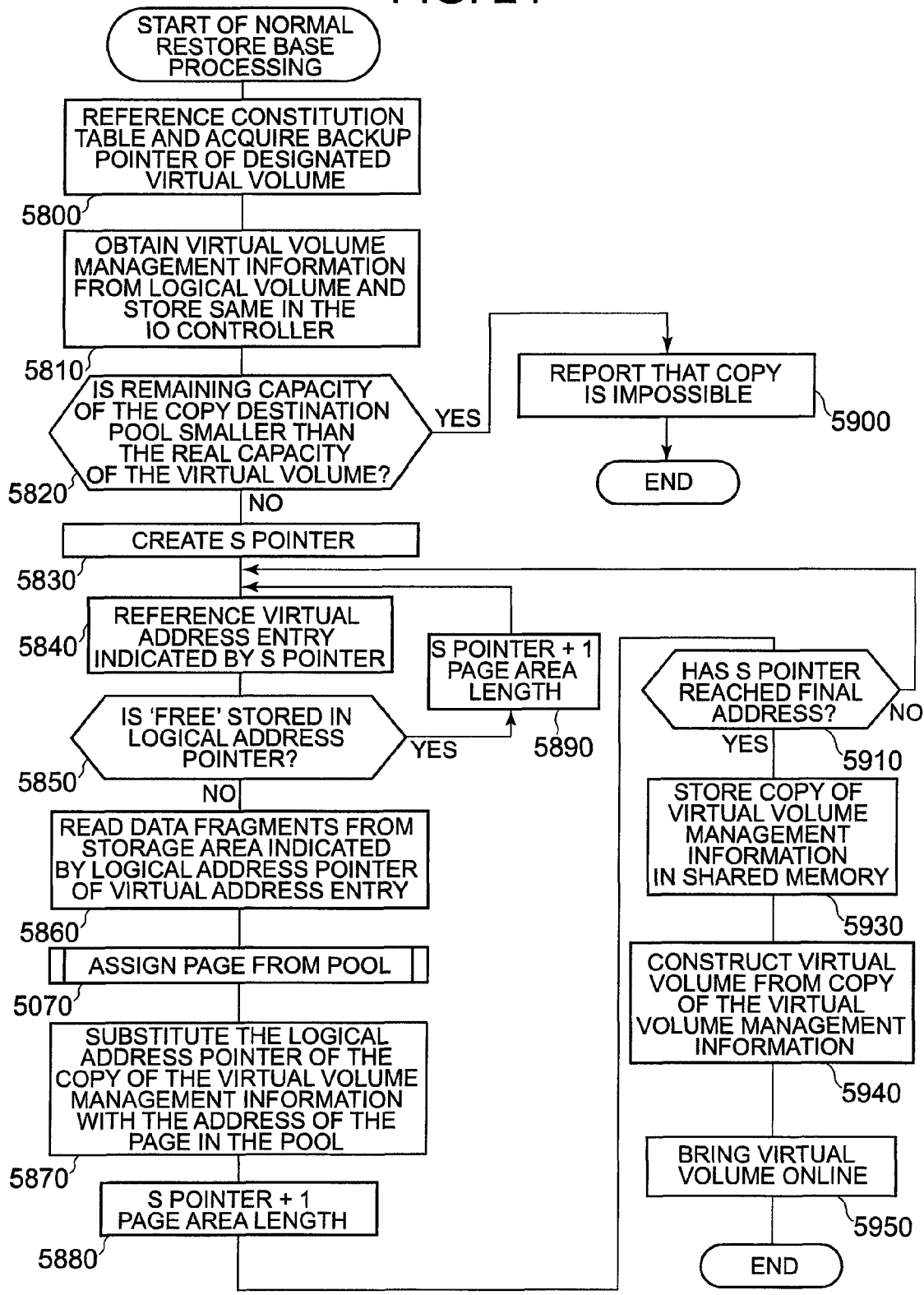
FIG. 24 is a flowchart of normal restore base processing of the storage system.

FIG. 24 is a flowchart of normal restore base processing of the storage system 300.

The storage system 300 starts normal restore base processing with respect to the virtual volume upon receipt of a copy control instruction of an IO request from the management computer 100 (instruction content 73002 is 'normal restore').

The IO controller 1300 acquires the identifier of the restore destination virtual volume that is contained in option 73005 of the IO request and acquires the backup pointer 13935 that corresponds with the volume ID 13931 that matches the identifier (volume ID 13931 of the constitution table 1383 stored in memory 1330 of the IO controller 1300) (step 5800).

Thereafter, the IO controller 1300 acquires a copy of the virtual volume management information 1270 stored in the storage area indicated by the acquired backup pointer 13935 (storage area indicated by the acquired backup pointer 13935 (storage area of the restore source logical volume) from the restore source logical volume and stores a copy of the acquired virtual volume management information 1270 in the memory 1330 of the IO controller 1300 (step 5810).

Thereafter, the IO controller 1300 judges whether the remaining free capacity of the pool that corresponds with the restore destination virtual volume (the total storage capacity of one or more unassigned pages) is smaller than the real capacity required for the restore destination virtual volume (step 5820). More specifically, for example, the IO controller 1300 counts the number of assignment flags 12905 indicating 'free' in the pool management information 1290 comprising the pool ID of the pool. Thereafter, the IO controller 1300 calculates the page capacity (the page storage capacity) for this number of assignment flags 12905 and specifies the free capacity of the pool. In addition, the IO controller 1300 uses the method of calculating the real capacity of the virtual volume described in the flow of FIG. 14 to specify the real capacity required of the restore destination virtual volume and compares the free capacity with the real capacity.

In cases where the result of the judgment of step 5820 is that the remaining free capacity of the pool is smaller than the real capacity of the virtual volume (Yes in step 5820), the IO controller 1300 reports a message indicating that a copy is impossible to the management computer 100.

In cases where the result of the judgment of step 5820 is that the remaining free capacity of the pool is greater than the real capacity of the virtual volume (No in step 5820), the IO controller 1300 stores the S pointer 1391 in the memory 1330 of the IO controller 1300 (step 5310). The S pointer 1391 used here indicates the leading virtual address entry of a copy of the virtual volume management information 1270 which corresponds with the restore destination virtual volume. The IO controller 1300 adds an entry to the copy pair management information 1210 and this entry includes the ID 12101 of the restore source logical volume ID 12101, the identifier 12103 of the storage system comprising the restore destination virtual volume, the identifier 12014 of the restore destination virtual volume, the free copy pair ID 12105 which is not currently being used by the storage system, the copy type 12107 which represents the local copy, and the copy status information 12102 that indicates that a copy is in progress (step 5830).

Thereafter, the IO controller 1300 references the virtual address entry indicated by the S pointer 1391 (the virtual address entry of the copy of the virtual volume management information 1270 stored in the memory 1330) (step 5840).

The IO controller 1300 then judges whether or not the logical address pointer 12705 of the referenced virtual address entry is 'free' (step 5850).

In cases where the result of the judgment of step 5850 is that the logical address pointer 12705 is 'free' (Yes in step 5850), the IO controller 1300 changes the S pointer 1391 to indicate the next virtual address entry by adding a page area length to the S pointer 1391 (step 5890) and performs the processing of step 5840 once again.

However, in cases where the result of the judgment of step 5850 is that the logical address pointer 12705 is not 'free' (No in step 5850), the IO controller 1300 reads data fragments from the storage area indicated by the logical address pointer 12705 (storage area in the restore source logical volume) (step 5860).

Thereafter, in the event of a data IO request with respect to the virtual area which corresponds with the virtual address indicated by the S pointer 1391, the IO controller 1300 assigns unassigned pages of the pool that corresponds with the restore destination virtual volume to the virtual area and writes the data fragments thus read to the assigned page (step 5070). The details of this processing are as described with reference to FIG. 13.

Thereafter, the IO controller 1300 substitutes the logical address pointer 12705 of the virtual address entry indicated by the S pointer 1391 with information that includes the address of the page assigned in the processing of step 5070 (step 5870).

The IO controller 1300 then updates the S pointer 1391 by adding an address value corresponding with one page area length to the S pointer 1391 (step 5880).

Subsequently, the IO controller 1300 judges whether the updated S pointer 1391 indicates the final virtual address entry of the copy of the virtual volume management information 1270 (step 5910).

In cases where the result of the judgment of step 5910 is that the S pointer 1391 has not reached the final virtual address entry (No in step 5910), the IO controller 1300 performs the processing of step 5840.

However, in cases where the result of the judgment of step 5910 is that the S pointer 1391 has reached the final virtual address entry (Yes in step 5910), the IO controller 1300 transfers a copy of the virtual volume management information 1270 from the memory 1330 to the shared memory 1200 (step 5930).

The IO controller 1300 is able to utilize the restore destination virtual volume on the basis of the copy of the virtual volume management information 1270 that is stored in the shared memory 1200 (step 5940).

Finally, the IO controller 1300 brings the restore destination virtual volume online (step 5950) and ends the normal restore base processing.

An example of the flow of the normal restore base processing was provided hereinabove. In the description of FIG. 24, the processing performed by the IO controller 1300 can be carried out by the processor 1310 that executes the copy processing program 230, for example. This processor 1310 is able to perform virtual volume-related processing by executing the virtual volume processing program 1220.

The backup instruction procedure and restore instruction procedure performed by the management computer 100 will be described next.

Figure 25A:
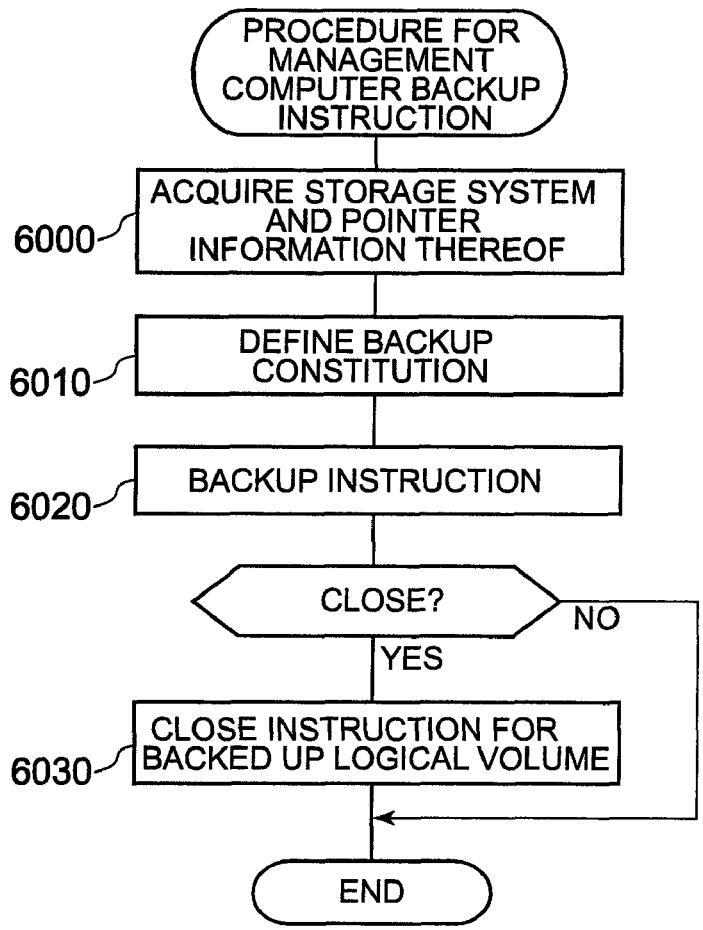
FIG. 25A shows the flow of the backup instruction procedure that the management computer performs.

FIG. 25A shows the flow of the backup instruction procedure that is performed by the management computer 100.

The management computer 100 acquires the information of the storage system 300 (6000). More specifically, for example, the processor 120 of the management computer 100 (suitably called the 'management processor' hereinbelow) creates a storage information table 114 and then issues an IO request 7300 that designates the logical volume identified by the management processor 120 and designates status acquisition for the instruction content 73002 to the storage system 300. The result of the IO request 7300 includes the existence of a storage system ID, a volume ID, and a virtual volume. The management processor 120 registers the result of the IO request 7300 in the storage information table 114. The management processor 120 effects this issue of an IO request for all the logical volumes identified by the management processor 120 (or designated by the user) and registers the result of each IO request in the storage information table 114.

Thereafter, the management processor 120 defines the backup constitution and, therefore, creates the copy information table 113 (step 6010). The management processor 120 registers the respective identifiers of the copy-source and copy-destination storage systems as the primary storage ID 1133 and secondary storage ID 1135 on the basis of the storage information table 114 obtained in step 6000. However, in the first embodiment, because a local copy is made, the primary storage ID 1133 and secondary storage ID 1135 are the same IDs. In addition, the management processor 120 registers the IDs of the respective volumes of the copy source and copy destination as the primary volume ID 1134 and secondary volume ID 1136. Here, according to the first embodiment, because it is a requirement that the copy source in the backup be a virtual volume, a volume ID 1142 for which the virtual flag 1143 is raised in the storage information table 114 (indicates a virtual volume) is registered as the primary volume ID 1134. However, a volume ID 1142 for which the virtual flag 1143 is not raised in the storage information table 114 is registered as the secondary volume ID 1136. The management processor 120 also includes, in the copy information table 1131, copy information 1131 that comprises information indicating a local copy and a group ID 1132 that indicates a group ID that is not used by the storage system.

Thereafter, because a backup up is started, the management processor 120 issues an IO request 7300 that includes a copy control instruction to the storage system 300 on the basis of the copy information table 113 (step 6020)). More specifically, the management processor 120 includes a primary storage ID 1133 and primary volume ID 1134 of the copy information table 113 in the destination 73001 of the IO request 7300 and the instruction content 73002 and includes a local copy new start, a copy source volume ID (primary volume ID 1134) and a copy destination volume ID (secondary volume ID 1136) in the instruction content 73002. In addition, the group ID 1132 of the copy information table 113 is designated as the group ID 73004. Furthermore, if necessary, volume information that is managed by the OS as additional information of the copy target virtual volume (the drive name, volume serial number, and so forth, for example) and the backup start time and so forth are included in option 73005. The management processor 120 then issues the IO request 7300 thus created to storage system 300.

Here, the management processor 120 must suspend the program by means of the AP 211 that is operated by the host computer 200. In this case, the management processor 120 issues an instruction to the Static IO program 214 on the host computer 200 prior to issuing the IO request 7300 for starting a backup to the storage system 300, and suspends the AP 211. The instruction from the management processor 120 to the host computer 200 is issued via the agent program 213. The agent program 213 on the host computer 200 issues an instruction to freeze the AP 211 to the Static IO program 214 in response to the instruction from the management processor 120. Furthermore, the management processor 120 saves information on the backup of the virtual volume (descriptive information on the virtual volume backed up, the backup destination volume, the backup time, and backup data and so forth) in the offline volume management table 111.

The virtual volume backup processing is started upon receipt of the IO request by the storage system 300. In cases where a backup of the same virtual volume in different generations (data fragment groups of the virtual volume at different times) or a backup of different virtual volumes is required, the management processor 120 carries out the above procedure each time. However, in cases where a logical volume constituting the backup destination of a certain virtual volume is the backup destination, the management processor 120 designates a local copy addition rather than a local copy new start for the IO request 7300 for the copy start.

In cases where a close execution is received from the user after a backup is complete (a judgment of whether the backup is complete can be carried out as a result of the management processor 120 issuing an IO request that designates the backup source virtual volume and status acquisition and depending on whether or not the result is that the copy is suspended), the management processor 120 executes close processing (step 6030). The management processor 120 issues an IO request that designates a close to the storage system 300.

Figure 25B:
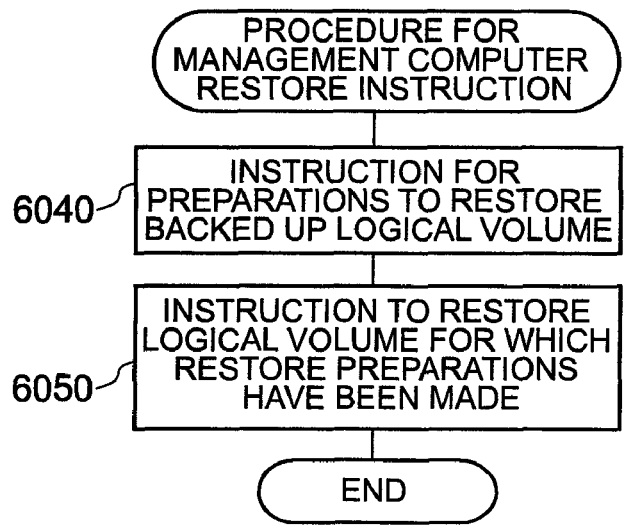
FIG. 25B shows the flow of the restore instruction procedure that the management computer performs.

FIG. 25B shows the flow of the restore instruction procedure that the management computer 100 performs.

The management processor 120 transmits an instruction for restore preparatory processing to the storage system 300 in order to restore a virtual volume from a logical volume that has undergone close processing (step 6040). More specifically, the management processor 120 issues an IO request that designates the restore preparations to the storage system 300. In response to this IO request, the ID of the restore source logical volume is designated as the primary volume ID and a secondary volume ID is not designated. As a result of the restore preparatory processing, the management processor 120 is able to create a list of information relating to the virtual volume backed up to the restore source logical volume of the storage system 300 (called the 'virtual volume list' hereinbelow) by acquiring the constitution table 1393 acquired in the restore preparatory processing, for example, from the storage system 300. The virtual volume list can be obtained as a result of the management processor 120 issuing an IO request designating status acquisition to the storage system 300. The virtual volume list may include, in addition to the ID of the virtual volume, OS management information on the backup target virtual volume of the option 73005 of the IO request created in step 6020 and the backup time, and so forth. By utilizing the virtual volume list, the management processor 120 is able to restore the backed up volume even when the offline volume management table 111 has been deleted, for example.

Thereafter, the management processor 120 transmits a restore base processing instruction to the restore source logical volume that has undergone restore preparatory processing to the storage system 300 (step 6050). More specifically, the management processor 120 issues an IO request that designates restore base processing to the storage system 300. This IO request designates the ID of the restore source logical volume as the primary volume ID and the ID of the restore destination logical volume (virtual volume) as the secondary volume ID, for example. In this embodiment, in cases where the backed up virtual volume is restored, it is necessary to designate a virtual volume that is not being used by the host computer 200 as the restore destination logical volume (that is, the secondary volume in the restore base processing) at this point in time and, consequently, a logical volume that the storage system 300 has not presented to the host computer 200 must be designated. Moreover, the IO request that designates the restore base processing designates either high-speed restore base processing or normal restore base processing in accordance with information relating to the host computer 200 (the application, specification or type, for example), for example.

The first embodiment was described hereinabove. According to the first embodiment, in a virtual volume backup, one or more data fragments that are stored in one or more pages assigned to a virtual volume are copied to the copy destination logical volume but a copy of virtual areas in the virtual volume to which pages have not been assigned is not generated. As a result, the futile consumption of storage areas in the copy destination logical volume can be prevented.

In addition, according to the first embodiment, one or more data fragments that are stored in the virtual volume are sequentially arranged (that is, packed) in the copy destination logical volume. As a result, free storage areas can be scattered in the copy destination logical volume. Further, a plurality of virtual volume backups can be acquired for one logical volume. In cases where a plurality of virtual volume backups are acquired for one logical volume, the constitution table 1393 indicating the location of the copy of the virtual volume management information 1270 for each logical volume is also stored in the copy destination logical volume. Hence, only an optional virtual volume can be restored from the copy destination logical volume.

In addition, according to the first embodiment, a copy of the virtual volume management information 1270 that represents the correspondence between the virtual areas and pages is also written to the copy destination logical volume and, at the time of a backup, the address of the page corresponding with the virtual area in the copy of the virtual volume management information 1270 is changed to the address of the copy destination storage area for the data fragments stored in the page. As a result, the virtual volume can be restored. More specifically, in the case of a restore, it is specified from the copy of the virtual volume management information 1270 in which storage area of the restore source logical volume (copy destination logical volume at the time of a backup) the data fragments which are stored in a virtual area of a particular backup source are stored and the data fragments stored in the specified storage area are written to the backup source virtual area (more specifically, the page assigned to the virtual area at the time of the restore).

Figure 32A:
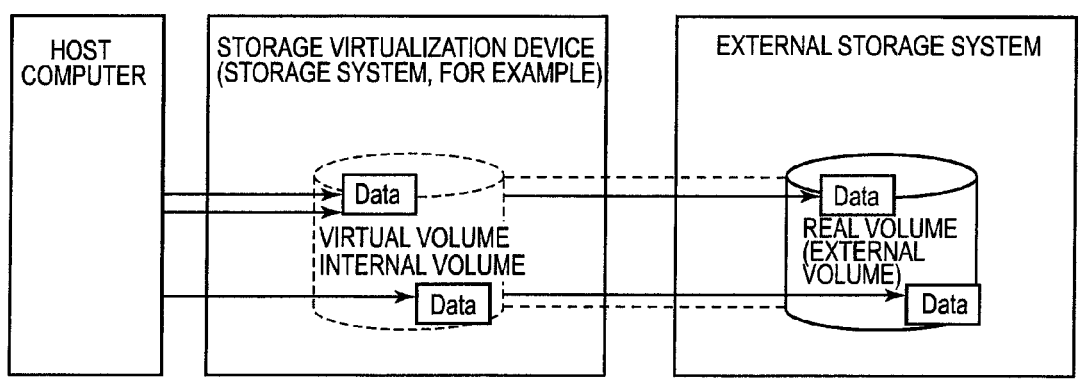
FIG. 32A is an example of a virtual volume that is adopted as a virtual-volume copy destination logical volume.
Figure 32B:
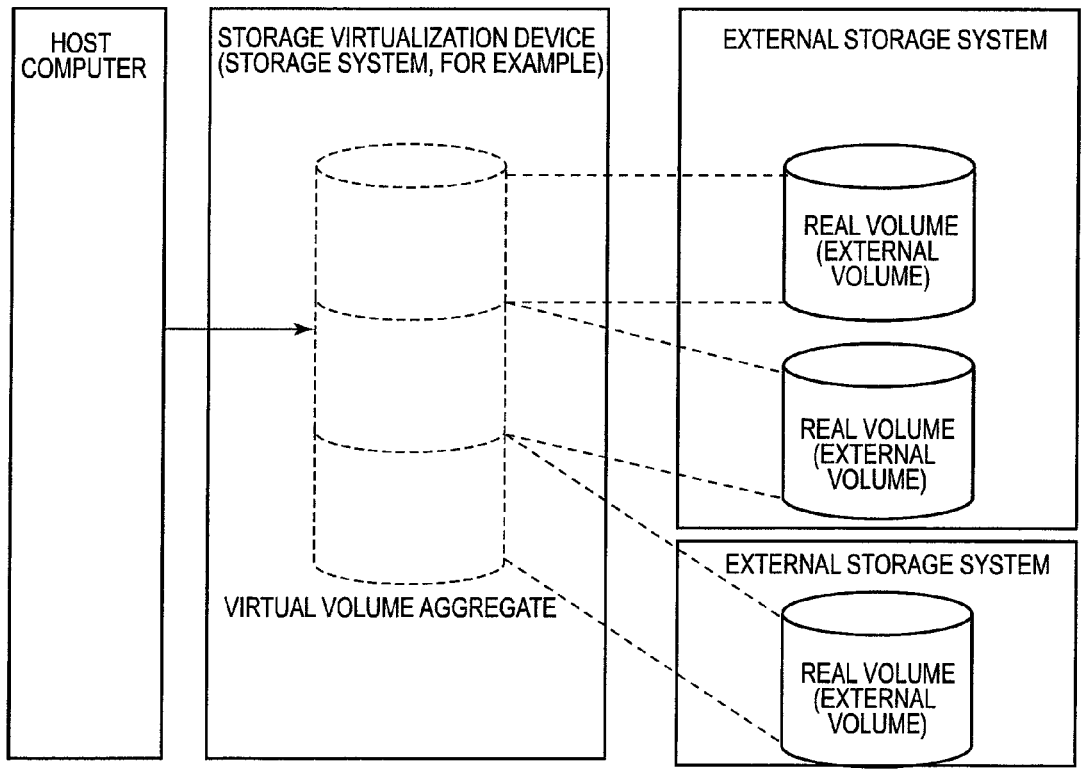
FIG. 32B is another example of a virtual volume that is adopted as a virtual-volume copy destination logical volume.

Further, the copy destination logical volume may be a real volume or a virtual volume. The virtual volume may be a logical volume according to Thin Provisioning technology. However, in order to receive the benefit of preventing storage areas from being wastefully consumed, a virtual volume of a type with which it is unmistakably settled which real area is accessed when a particular virtual area of the virtual volume is the access destination is preferably adopted. A virtual volume of this type can, for example, be a virtual volume that adheres to storage virtualization technology and, more specifically, a virtual volume with which a real volume that exists in an external storage system is associated as illustrated in FIG. 32A, for example. This virtual volume can be provided by a storage virtualization device (may also be a switch or a storage system), for example. In addition, an aggregate of virtual volumes that adhere to such storage virtualization technology may also be adopted as the copy destination logical volume, as illustrated in FIG. 32B. In this case, the respective external volumes (real volumes) that correspond to the respective virtual volumes constituting the aggregate of virtual volumes (one logical volume) exist in one or a plurality of external storage systems.

Second Embodiment

The second embodiment of the present invention will be described hereinbelow mainly with respect to the differences from the first embodiment (a description of the points in common with the first embodiment will be omitted or simplified).

According to the computer system of the second embodiment, one or more data fragments which are stored in a virtual volume in the storage system are copied to a logical volume in another storage system in a remote location. Thereupon, the one or more data fragments are sequentially arranged in the copy destination logical volume as per the first embodiment.

Figure 26:
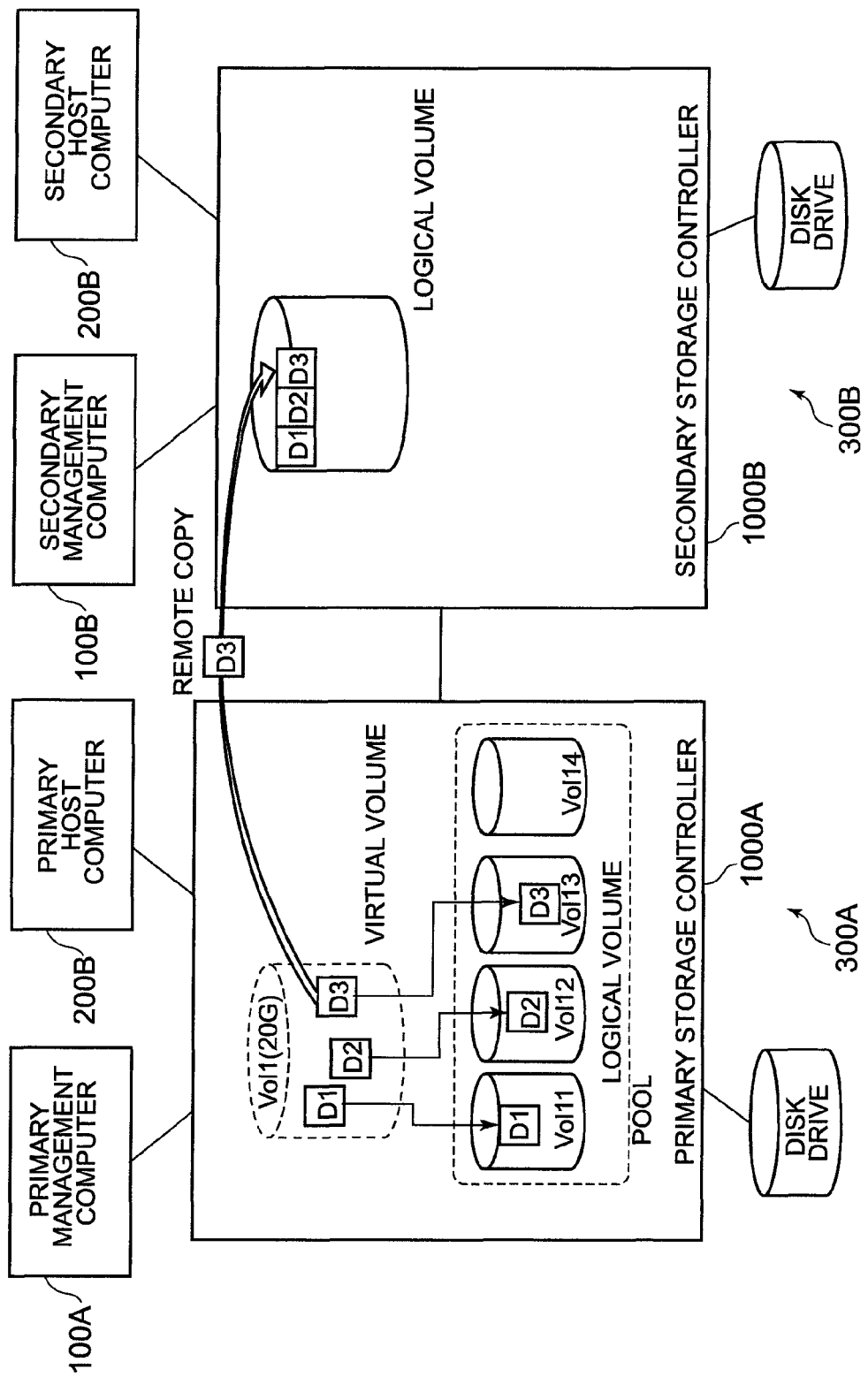
FIG. 26 is a block diagram showing the constitution of the computer system according to a second embodiment of the present invention.

The constitution of the second computer system is shown in FIG. 26. In the case of the second computer system, computer systems that are disposed at physically different sites are connected via a storage system using a data line 512. The first computer system is a computer system that executes the main work (the current computer system), while the other is a standby computer system. The former computer system is called the primary computer system and the latter is known as the secondary computer system. The constituent elements of the primary computer system have a character such as 'A' appended at the end of the reference numerals ('primary computer 100A, primary host computer 200A, and primary storage system 300A, for example), and the constituent elements of the secondary computer system have a character such as 'B' appended at the end of the reference numeral (secondary management computer 100B, secondary host computer 200B, and secondary storage system 300B, for example)

The processing that is carried out in the second embodiment is substantially the same as that of the first embodiment except for the virtual volume backup processing.

Here, the differences of the virtual volume backup processing according to the second embodiment with respect to the virtual volume backup processing according to the first embodiment will be described.

Figure 27:
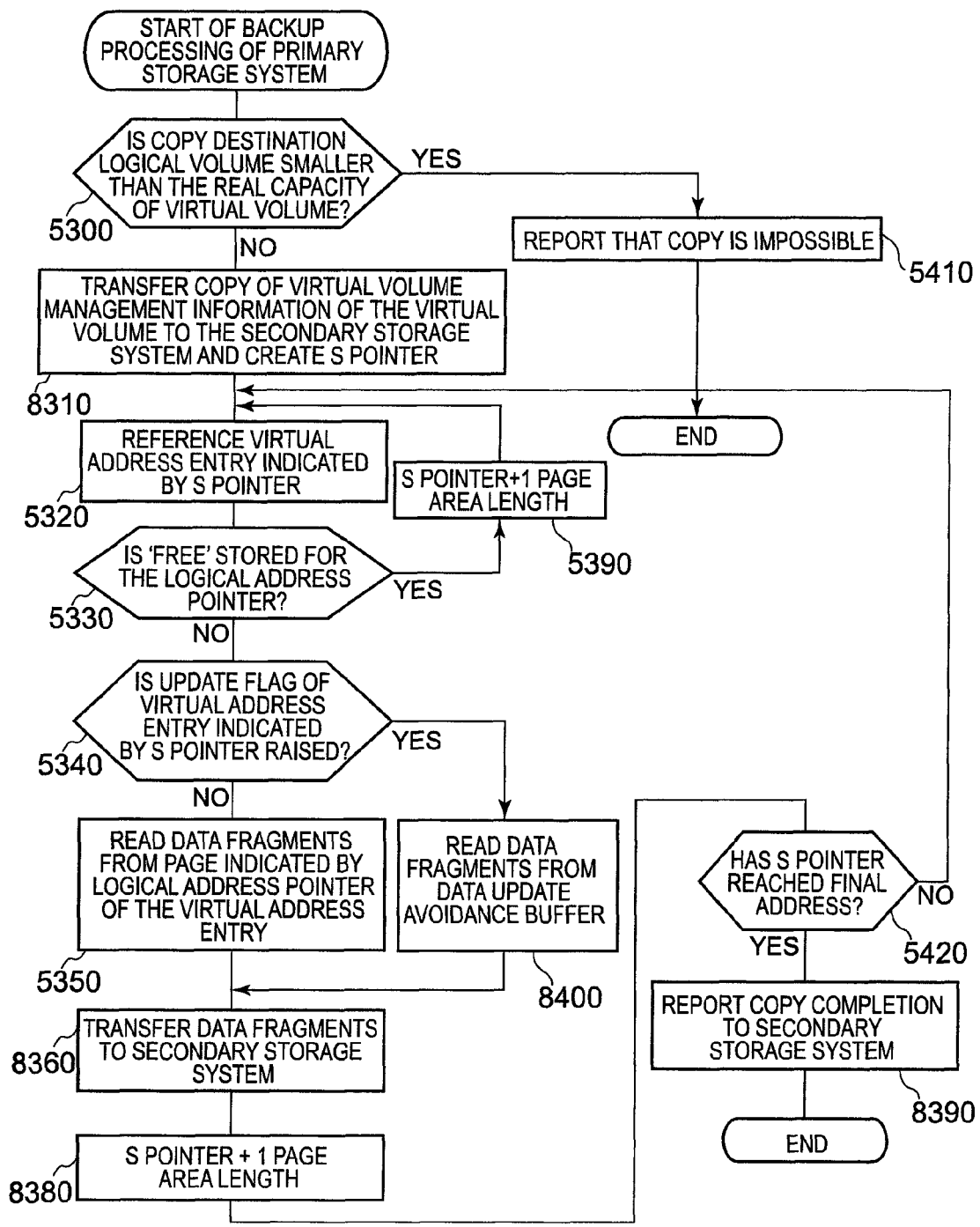
FIG. 27 is a flowchart of virtual volume backup processing of a primary storage system.

FIG. 27 is a flowchart of virtual volume backup processing of primary storage system 300A.

The difference between FIG. 14 and FIG. 27 resides in the fact that steps 5310, 5360, 5380, and 5430 in FIG. 14 have been changed to steps 8310, 8360, 8380, and 8390 respectively in FIG. 27 and in that the processing corresponding to steps 5370 and 5440 in FIG. 14 does not exist in FIG. 27.

One or both of the primary storage system 300A and secondary storage system 300B starts the backup processing of the virtual volume upon receipt of an IO request (a copy control instruction (the instruction content 73002 is 'remote copy new start')) from the primary computer 100A and/or the secondary computer 100B. In cases where only one storage system 300A or 300B receives the IO request, this IO request is transferred to the other storage system 300B or 300A, for example.

In step 8310, the IO controller 1300A of the primary storage system 300A not only copies virtual volume management information 1270A but also transfers a copy of the virtual volume management information 1270A to the secondary storage system 300B. The processing to create the T pointer does not exist.

In step 8360, the IO controller 1300A transfers the data fragments thus read to the secondary storage system 300B.

In step 8390, the IO controller 1300A reports the fact that the backup processing by the primary storage system 300A is complete to the secondary storage system 300B.

Figure 28:
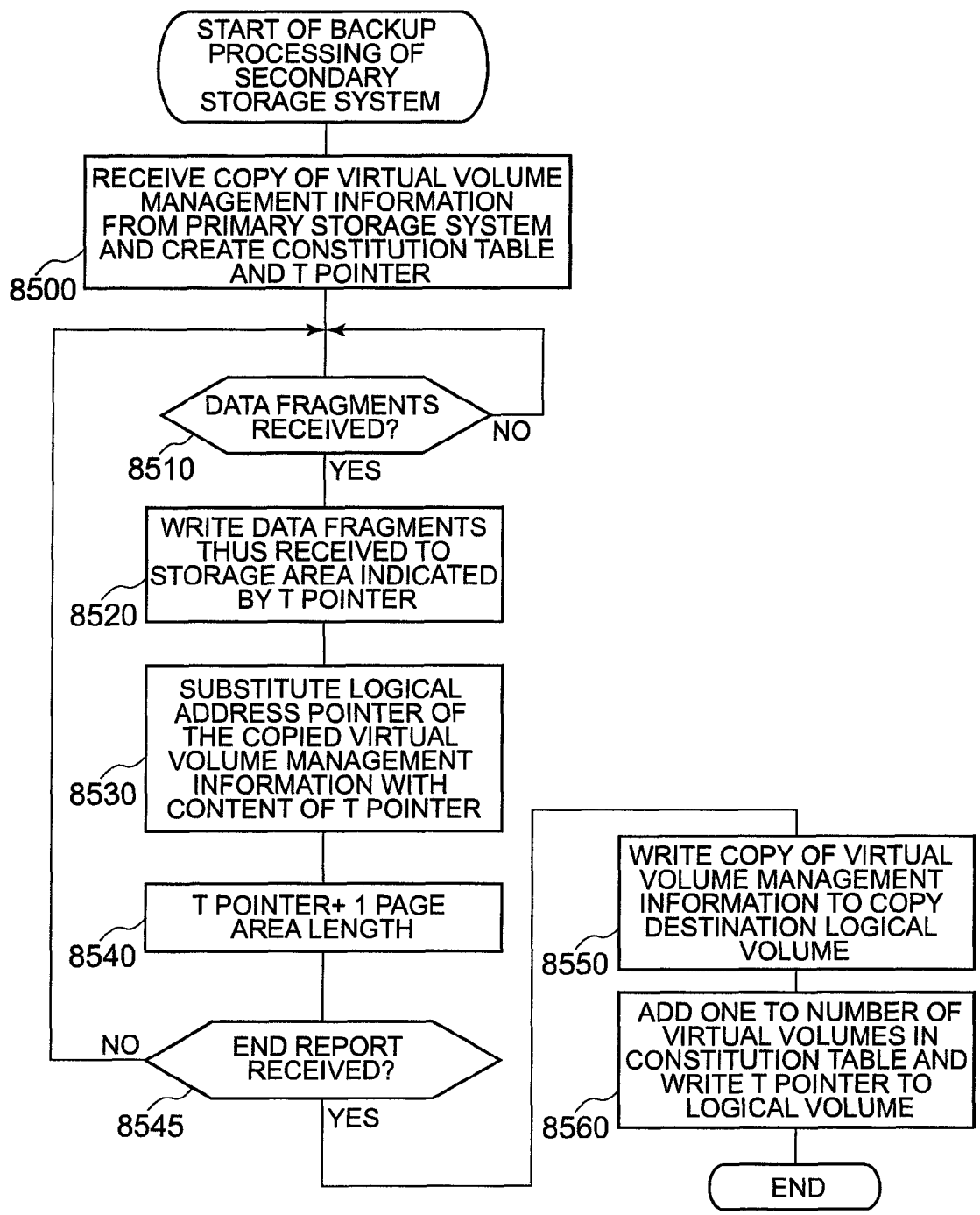
FIG. 28 is a flowchart of virtual volume backup processing of a secondary storage system.

FIG. 28 is a flowchart of virtual volume backup processing of the secondary storage system 300B.

Upon receipt of a copy of the virtual volume management information 1270 that was transferred from the primary storage system 300A, the IO controller 1300B of the secondary storage system 300B stores the copy in the memory 1330B of the IO controller 1300B. Thereafter, the IO controller 1300B creates the T pointer 1392 and constitution table 1393 and stores same in the memory 1330B. In addition, the IO controller 1300B adds an entry to the copy pair management information 1210B and the entry includes the ID 12101 of the copy source logical volume ID 12101, the ID 12103 of the secondary storage system 300B, the ID 12014 of the copy destination logical volume, the copy pair ID 12105 that is stored in the IO request, the copy type 12107 that represents a remote copy, and copy status information 12102 that represents 'copy in progress' (step 8500).

Thereafter, the IO controller 1300B stands by to accept data fragments from the primary storage system 300A (step 8510).

Upon receipt of the data fragments (Yes in step 8510), the IO controller 1300B writes the received data fragments to the storage area in the copy destination logical volume (the storage area that corresponds to the address indicated by the T pointer 1392) (step 8520).

Thereafter, the IO controller 1300B substitutes the logical address pointer 12705 in the copy of the virtual volume management information 1270 thus received with the T pointer 1392 (step 5830).

Subsequently, the IO controller 1300B adds an address value corresponding to one page area length to the T pointer 1392 (step 5840).

Thereafter, the IO controller 1300B judges whether a backup termination report has arrived from the primary storage system 300A (step 5845).

In the judgment of step 5845, in cases where a backup termination report is received (Yes in step 5845), the IO controller 1300B writes a copy of the virtual volume management information 1270 to a storage area in the copy destination logical volume (the storage area that corresponds with the address indicated by the updated T pointer 1392) (step 5850).

Finally, the IO controller 1300B adds one to the number of virtual volumes 13936 in the constitution table 1393, adds an address value corresponding to the page length of the copy of the virtual volume management information 1270 to the T pointer 1392, registers the updated T pointer 1392 as the T pointer 13937 of the constitution table 1393 (step 5860), changes the copy status information 12102 of the copy pair management information 1210 to 'suspended', and terminates the processing.

Figure 29:
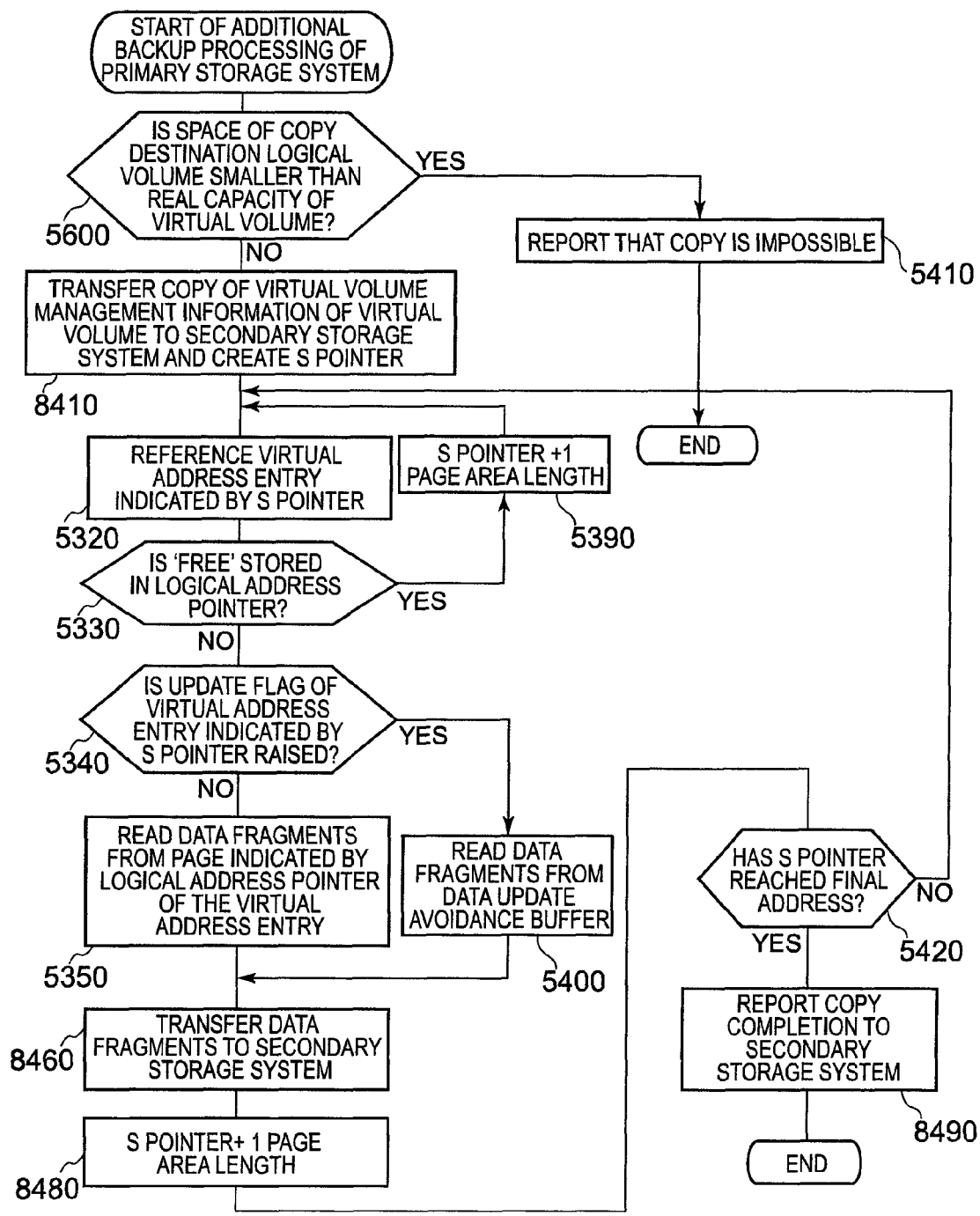
FIG. 29 is a flowchart of additional backup processing of the primary storage system.

FIG. 29 is a flowchart of additional backup processing of the primary storage system 300A.

The additional backup processing of the primary storage system 300A is also the same as the additional backup processing shown in FIG. 16 except for a portion of the processing. The difference between FIGS. 16 and 29 resides in the fact that steps 5610, 5660, 5680, and 5630 in FIG. 16 have been changed to steps 8310, 8360, 8380, and 8390 respectively in FIG. 29 and in that steps 5670 and 5640 in FIG. 16 do not exist in FIG. 29.

When one or both of the primary storage system 300A and secondary storage system 300B starts virtual volume backup processing upon receipt of an IO request (copy control instruction (instruction content 73002 is 'remote copy addition')) from the primary computer 100A and/or secondary management computer 100B. In cases where only one storage system 300A or 300B receives the IO request, the IO request is transferred to the other storage system 300B or 300A, for example.

Steps 8310, 8360, 8380, and 8390 in FIG. 29 are the same as the steps with the same numbers illustrated in FIG. 27 and a description of these steps is therefore omitted here.

Figure 30:
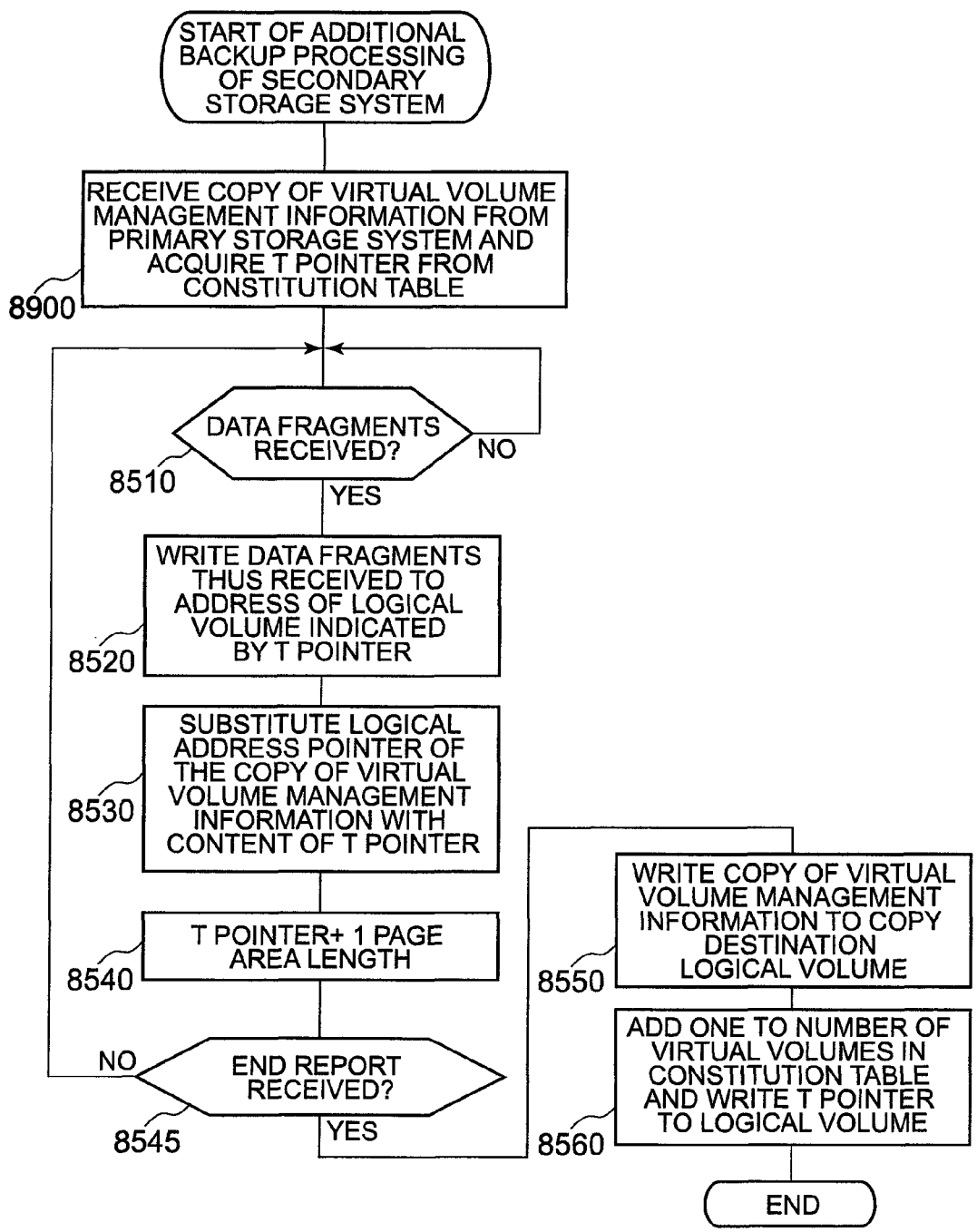
FIG. 30 is a flowchart of additional backup processing of the secondary storage system.

FIG. 30 is a flowchart of additional backup processing of the secondary storage system 300B.

The additional backup processing of the secondary storage system 300B is the same as the processing of FIG. 28 except for a portion of the processing. The difference between FIGS. 30 and 28 is only step 8500. Step 8500 in FIG. 28 corresponds to step 8900 in FIG. 30.

In step 8900, the IO controller 1300B stores a copy of the virtual volume management information 1270 in the memory 1330B in the IO controller 1300B upon receipt of data fragments from the primary storage system 300A. In addition, the IO controller 1300B reads the T pointer from the created constitution table 1393 that is stored in memory 1330B. Thereafter, the IO controller 1300B includes, in the added entry created in the copy pair management information 1210, the ID 12101 of the copy source virtual volume, the ID 12103 of the secondary storage system 300B, the ID 12014 of the copy destination logical volume, the copy pair ID 12105 that is stored in the IO request, the copy type 12107 that represents a remote copy, and copy status information 12102 that indicates copy in progress.

The second embodiment was described hereinabove. According to the second embodiment, one or more data fragments of the primary volume (virtual volume) and a copy of virtual volume management information 1270 that corresponds with the virtual volume can be sequentially arranged in the secondary volume.

Although a few preferred embodiments of the present invention were described hereinabove, the above embodiments are examples to illustrate the present invention, there being no intention to limit the scope of the present invention to these embodiments alone. The present invention can also be implemented by means of a variety of other embodiments.

For example, the logical volumes that constitute the pool may be virtual volumes that adhere to storage virtualization technology instead of real volumes. Further, the logical volumes that constitute the pool may also exist in a storage system 300 outside the storage system 300, for example.

In addition, for example, a plurality of virtual volumes that exist in a plurality of primary storage systems 300A may be backed up to one logical volume of the secondary storage system 300B.

Figure 33:
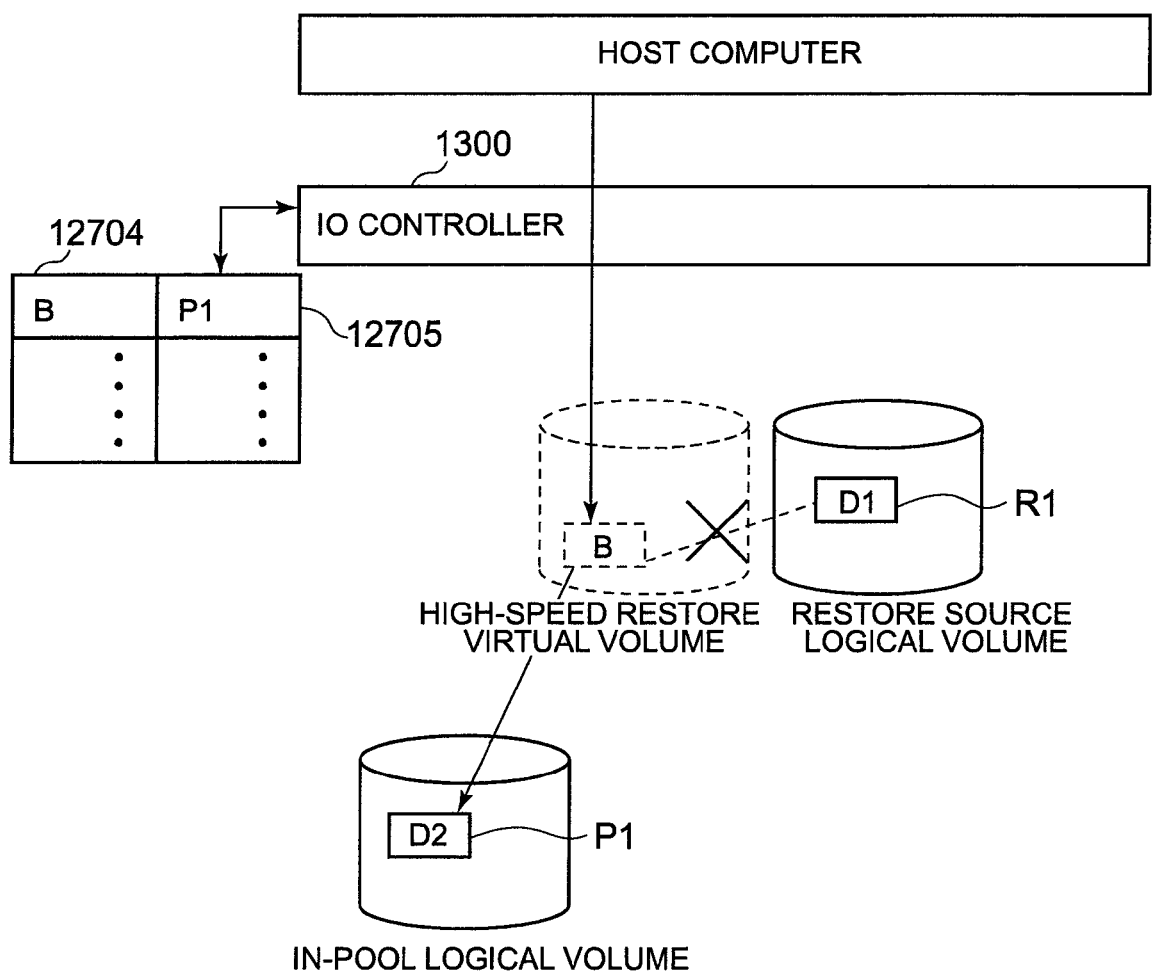
FIG. 33 is a schematic diagram of the processing of a write request that designates a high-speed restore virtual volume.

Furthermore, for example, the IO controller 1300 may accept, not only read requests with respect to a high-speed restore virtual volume, but also write requests. More specifically, for example, as shown in FIG. 33, in cases where a write request designating a virtual area B in the high-speed restore virtual volume is received, the IO controller 1300 assigns page P1 to the virtual area B, writes a data fragment D2 that corresponds to the write request to page P1, and, in the address map of the copy of the virtual volume management information 1270 that corresponds with the high-speed restore virtual volume, the IO controller 1300 changes the address (logical address pointer 12705) that is associated with the virtual area B (virtual area 12704) from the address of storage area R1 to the address of page P1. Thereafter, for example, in cases where a read request designating the virtual area B is received from the host computer 200, the IO controller 1300 specifies page P1 which corresponds with the virtual area B from the address map, reads data fragment D2 from the specified page P1 and transmits same to the host computer 200.

What is claimed is:

1. A storage system, comprising:
a first virtual volume that is constituted by a plurality of virtual areas and is based on thin provisioning technology;
a second virtual volume that is based on storage virtualization technology and corresponds with an external logical volume that is formed based on a removable external storage device;
a pool that has a plurality of pages which are storage areas that can be assigned to the virtual areas of the first virtual volume;
mapping information that indicates which of the plurality of pages correspond with which virtual areas;
an I/O processing unit that receives a write request from a computer, assigns a page in the pool to a virtual area of the first virtual volume that is designated by the write request, writes data fragments corresponding to the write request to the assigned page, and associates information representing the page with information representing the virtual area to which the page is assigned, in the mapping information;
a backup processing unit that copies a plurality of data fragments that are stored in each of a plurality of pages that are assigned to the first virtual volume to the second virtual volume, the plurality of data fragments being serially arranged in the second virtual volume, updates information representing the respective copy source pages in the mapping information to information that represents respective copy destination pages for the data fragments stored in the respective copy source pages, and copies the updated mapping information to the second virtual volume; and
a restore processing unit that reads the mapping information from the second virtual volume and provides the computer with a restore virtual volume which is a virtual volume based on the mapping information without executing restore copy processing that reads a plurality of data fragments specified by the mapping information from the second virtual volume and copies the plurality of data fragments to a plurality of pages which are assigned to a plurality of virtual areas, in the restore virtual volume, specified by the mapping information,
wherein the I/O processing unit receives a read request, from the computer, that designates the restore virtual volume, specifies the storage area which is in the second virtual volume and corresponds with the virtual area designated by the read request from the mapping information, reads data fragment from the specified storage area, and transmits the data fragment to the computer, and
wherein the I/O processing unit does not accept a write request, from the computer that designates the restore virtual volume.

2. The storage system according to claim 1, wherein the backup processing unit starts to write the updated mapping information starting from the next storage area following the plurality of consecutive storage areas in which the plurality of data fragments are arranged.

3. The storage system according to claim 1,
wherein a plurality of first virtual volumes exist, and
wherein the backup processing unit copies a plurality of data fragments which are stored in each of a plurality of pages assigned to the first virtual volumes and the updated mapping information for a certain first virtual volume among the plurality of first virtual volumes and subsequently writes the plurality of data fragments which are stored in each of the plurality of pages assigned to the first virtual volumes and the updated mapping information for another first virtual volume among the plurality of first virtual volumes.

4. The storage system according to claim 3, wherein the backup processing unit creates constitutional information indicating where in the second virtual volume the mapping information for a particular virtual volume is stored and copies the constitutional information to the second virtual volume.

5. The storage system according to claim 4,
wherein the restore processing unit reads the constitution information from the second virtual volume, specifies, from the constitution information, the location in which the mapping information corresponding with a first virtual volume that is selected from two or more first virtual volumes is stored, reads the mapping information corresponding with the selected first virtual volume from the specified location of the second virtual volume, and provides the computer with a first virtual volume based on the mapping information.

6. The storage system according to claim 1, wherein the I/O processing unit accepts a read request designating the restore virtual volume from the computer but does not accept a write request designating the restore virtual volume from the computer.

7. The storage system according to claim 1, wherein, when a write request designating the restore virtual volume is accepted from the computer, the I/O processing unit updates information representing storage areas of the second virtual volume, which corresponds to information that represents the virtual areas designated by the write request in the mapping information, to information representing the pages assigned to the virtual areas.

8. A remote backup system, comprising:
a storage system; and
a removable storage device coupled to the first storage system,
wherein the first storage system comprises:
a first virtual volume that is constituted by a plurality of virtual areas and is based on thin provisioning technology;
a second virtual volume that is based on storage virtualization technology and corresponds with an external logical volume that is formed based on a removable external storage device;
a pool that has a plurality of pages which are storage areas that can be assigned to the virtual areas of the first virtual volume;
mapping information that indicates which pages correspond with which virtual areas;
an I/O processing unit that receives a write request from a computer, assigns a page in the pool to a virtual area of a first virtual volume that is designated by the write request, writes data fragments corresponding to the write request to the assigned page, and associates information representing the page with information representing the virtual area to which the page is assigned, in the mapping information;
a backup processing unit that copies a plurality of data fragments that are stored in each of a plurality of page that are assigned to the first virtual volume to the second virtual volume, the plurality of data fragments being serially arranged in the second virtual volume, updates information representing the respective copy source pages in the mapping information to information that represents respective copy destination pages for the data fragments stored in the respective copy source pages, and copies the updated mapping information to the second virtual volume; and
a restore processing unit that reads the mapping information from the second virtual volume and provides the computer with a restore virtual volume which is a virtual volume based on the mapping information without executing restore copy processing that reads a plurality of data fragments specified by the mapping information from the second virtual volume and copies the plurality of data fragments to a plurality of pages which are assigned to a plurality of virtual areas, in the restore virtual volume, specified by the mapping information, wherein the I/O processing unit receives a read request, from the computer, that designates the restore virtual volume, specifies the storage area which is in the second virtual volume and corresponds with the virtual area designated by the read request from the mapping information, reads data fragment from the specified storage area, and transmits the data fragment to the computer, and
wherein the I/O processing unit does not accept a write request, from the computer, that designates the restore virtual volume.

9. A virtual volume backup method, comprising the steps of:
specifying a page constituting a storage area assigned to a virtual area in a first virtual volume on the basis of mapping information that indicates which storage area is associated with which virtual area;
copying a plurality of data fragments that are stored in each of a plurality of pages assigned to the first virtual volume to a second virtual volume that is based on storage virtualization technology and corresponds with an external logical volume that is formed based on a removable external storage device, the plurality of data fragments being serially arranged in the second virtual volume;
updating information representing respective copy source pages that correspond with information representing respective virtual areas in the mapping information to information that represents respective copy destination pages for data fragments which are stored in the respective copy source pages and copying the updated mapping information to the second virtual volume;
reading the mapping information from the second virtual volume and providing the computer with a tore virtual volume which is a virtual volume based on the mapping information without executing restore copy processing that reads a plurality of data fragments specified by the mapping information from the second virtual volume and copies the plurality of data fragments to a plurality of pages which are assigned to a plurality of virtual areas, in the restore virtual volume, specified by the mapping information;
receiving a read request, from the computer, that designates the restore virtual volume, specifying the storage area which is in the second virtual volume and corresponds with the virtual area designated by the read request from the mapping information, reading data fragment from the specified storage area and transmitting the data fragment to the computer; and
not accepting a write request, from the computer, that designates the restore virtual volume.

10. The backup method according to claim 9, wherein the plurality of data fragments which are stored in each of the plurality of pages assigned to the first virtual volume and the updated mapping information are copied for a certain first virtual volume among a plurality of virtual volumes, and, subsequently, the plurality of data fragments which are stored in each of the plurality of pages assigned to the first virtual volume and the updated mapping information are written for another first virtual volume among the plurality of first virtual volumes.

11. The backup method according to claim 10, wherein constitution information indicating where in the second virtual volume the mapping information for a particular first virtual volume is stored is created and the constitutional information is copied to the second virtual volume.

12. The backup method according to claim 11, wherein the constitution information is read from the second virtual volume, the location in which the mapping information corresponding with a first virtual volume that is selected from two or more first virtual volumes is stored is specified from the constitution information, reads the mapping information corresponding with the selected first virtual volume from the specified location of the second virtual volume, and provides the computer with a first virtual volume based on the mapping information.

* * * * *